US 10,893,557 B2

(12) United States Patent
Gulati et al.

(10) Patent No.: US 10,893,557 B2
(45) Date of Patent: Jan. 12, 2021

(54) RELAYING IN A DEVICE-TO-DEVICE COMMUNICATION SYSTEM

(71) Applicant: QUALCOMM Incorporated, San Diego, CA (US)

(72) Inventors: Kapil Gulati, Dover, DE (US); Sudhir Kumar Baghel, Hillsborough, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/960,155

(22) Filed: Apr. 23, 2018

(65) Prior Publication Data

US 2018/0324882 A1  Nov. 8, 2018

Related U.S. Application Data

(60) Provisional application No. 62/502,339, filed on May 5, 2017.

(51) Int. Cl.
*H04W 76/14* (2018.01)
*H04W 72/14* (2009.01)
(Continued)

(52) U.S. Cl.
CPC ........ *H04W 76/14* (2018.02); *H04B 7/15542* (2013.01); *H04L 5/0044* (2013.01);
(Continued)

(58) Field of Classification Search
None
See application file for complete search history.

(56) References Cited

U.S. PATENT DOCUMENTS 10,069,557 B2  9/2018  Yi et al.
2013/0322413 A1  12/2013  Pelletier et al.
(Continued)

FOREIGN PATENT DOCUMENTS

EP  3 125 643 A1  2/2017
EP  3 297 364 A1  3/2018
(Continued)

OTHER PUBLICATIONS

International Search Report and Written Opinion—PCT/US2018/029166—ISA/EPO—dated Jul. 9, 2018 14 pages.
(Continued)

*Primary Examiner* — Christine T Duong
(74) *Attorney, Agent, or Firm* — Arent Fox LLP

(57) ABSTRACT

The present aspects relate to device-to-device (D2D) relaying in a wireless communication system. In an aspect, a relay user equipment (UE) may receive, on a downlink channel from a network entity, at least one indication including resource allocation information for at least one of the relay UE or a remote UE. The relay UE may further transmit, on a sidelink channel to the remote UE, the resource allocation information of the remote UE. In another aspect, a remote UE may receive, on at least one sidelink channel, resource allocation information from a relay UE, the resource allocation information indicating one or more resources allocated for sidelink communication for the remote UE. The remote UE may further transmit, on one or more sidelink channels, data to the relay UE in accordance with the one or more resources allocated for sidelink communication.

23 Claims, 14 Drawing Sheets

(51) Int. Cl.
  *H04W 72/04* (2009.01)
  *H04W 4/70* (2018.01)
  *H04B 7/155* (2006.01)
  *H04L 5/00* (2006.01)
  *H04W 88/04* (2009.01)
  *H04W 8/26* (2009.01)
  *H04L 27/00* (2006.01)

(52) U.S. Cl.
  CPC ........... *H04W 4/70* (2018.02); *H04W 72/042* (2013.01); *H04W 72/14* (2013.01); *H04L 5/001* (2013.01); *H04L 27/0006* (2013.01); *H04W 8/26* (2013.01); *H04W 72/0446* (2013.01); *H04W 88/04* (2013.01)

(56) References Cited

U.S. PATENT DOCUMENTS

| | | | |
|---|---|---|---|
| 2014/0334392 A1 | 11/2014 | Gage et al. | |
| 2014/0348079 A1 | 11/2014 | Turtinen et al. | |
| 2015/0004901 A1 | 1/2015 | Agiwal et al. | |
| 2016/0044666 A1* | 2/2016 | Shin | H04W 72/1278 370/336 |
| 2016/0227578 A1 | 8/2016 | Lee et al. | |
| 2016/0338095 A1* | 11/2016 | Faurie | H04W 28/0278 |
| 2017/0013640 A1 | 1/2017 | Loehr et al. | |
| 2017/0054540 A1* | 2/2017 | Kim | H04L 5/0048 |
| 2017/0290028 A1 | 10/2017 | Lee et al. | |
| 2018/0048986 A1 | 2/2018 | Adachi et al. | |
| 2018/0070264 A1 | 3/2018 | Saiwai et al. | |
| 2018/0084478 A1 | 3/2018 | Lee et al. | |
| 2018/0146494 A1 | 5/2018 | Khoryaev et al. | |
| 2018/0192461 A1 | 7/2018 | Naik et al. | |
| 2018/0213577 A1 | 7/2018 | Burbidge et al. | |
| 2018/0242381 A1* | 8/2018 | Wei | H04W 40/22 |
| 2018/0324842 A1 | 11/2018 | Gulati et al. | |
| 2018/0324848 A1 | 11/2018 | Baghel et al. | |
| 2019/0028962 A1 | 1/2019 | Chun | |
| 2019/0029061 A1 | 1/2019 | Feng | |
| 2019/0174530 A1* | 6/2019 | Kim | H04W 4/40 |
| 2019/0182840 A1* | 6/2019 | Feng | H04W 72/06 |
| 2020/0029353 A1 | 1/2020 | Xu et al. | |

FOREIGN PATENT DOCUMENTS

| | | |
|---|---|---|
| WO | WO-2016/186059 A1 | 11/2016 |
| WO | WO-2016182601 A1 | 11/2016 |
| WO | WO-2017/026970 A1 | 2/2017 |

OTHER PUBLICATIONS

3GPP TS 36.213: "3 Generation Partnership Project; Technical Specification Group Radio Access Network; Evolved Universal Terrestrial Radio Access (E-UTRA); Physical layer procedures (Release 14)", 3GPP Standard; Technical Specification; 3rd Generation Partnership Project (3GPP), Mobile Competence Centre; 650, Route Des Lucioles ; F-06921 Sophia-Antipolis Cedex; France, vol. RAN WG1, No. V14.2.0, Mar. 23, 2017 (Mar. 23, 2017), pp. 385-441, XP051291437, [retrieved on Mar. 23, 2017].
3GPP TS 36.321: "3rd Generation Partnership Project; Technical Specification Group Radio Access Network; Evolved Universal Terrestrial Radio Access (EUTRA); Medium Access Control (MAC) protocol specification (Release 14)", 3GPP Standard; Technical Specification; 3rd Generation Partnership Project (3GPP), Mobile Competence Centre; 650, Route Des Lucioles ; F-06921Sophia-Antipolis Cedex; France, vol. RAN WG2, No. V14.2.1, Apr. 27, 2017 (Apr. 27, 2017), pp. 1-106, XP051298198, [retrieved on Apr. 27, 2017].
Huawei: "Report of Email Discussion [96#57][LTE/FeD2D]—Adapter Layer and Bearer Handling", 3GPP Draft; R2-1701133, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 12, 2017 (Feb. 12, 2017), XP051211844, 12 pages, Retrieved from the Internet: URL:http://www.3gpp.org/ftp/Meetings_3GPP_SYNC/RAN2/Docs/ [retrieved on Feb. 12, 2017].
International Search Report and Written Opinion—PCT/US2018/030388—ISA/EPO—dated Aug. 21, 2018 17 pages.
KPN: "New Solution for Service Continuity", 3GPP Draft; S2-172113-PCR_New Solution for Service Continuity, 3rd Generation Partnership Project (3GPP), Mobile Competence Centre; 650, Route Des Lucioles; F-06921 Sophia-Antipolis Cedex; France, vol. SA WG2, No. Susan, South Korea; Mar. 27, 2017-Mar. 31, 2017, Mar. 26, 2017 (Mar. 26, 2017), XP051247840, pp. 1-3, Retrieved from the Internet: URL:http://www.3gpp.org/ftp/Meetings_3GPP_SYNC/SA2/Docs/ [retrieved on Mar. 26, 2017].
Nokia et al: "Issues Related to Sidelink Control Layer-1 ID and Layer-2 ID", 3GPP Draft; R2-703366_FED2D_L1_L2_DS_Final, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017, Apr. 3, 2017 (Apr. 3, 2017), XP051245234, 2 pages, Retrieved from the Internet: URL:http://www.3gpp.org/ftp/Meetings_3GPP_SYNC/RAN2/Docs/ [retrieved on Apr. 3, 2017].
ZTE: "Discussion on PC5 Connection Establishment and Maintenance", 3GPP Draft; R2-700794_Discussion on PC5 Connection Establishment and Maintenance, 3rd Generation Partnership Project (3GPP), Mobile Competence Centre; 650, Route Des Lucioles; F-06921 Sophia-Antipo, vol. RAN WG2, No. Athens, Greece; Feb. 13, 2017-Feb. 17, 2017, Feb. 12, 2017 (Feb. 12, 2017), XP051211579, 4 pages, Retrieved from the Internet: URL:http://www.3gpp.org/ftp/Meetings_3GPP_SYNC/RAN2/Docs/ [retrieved on Feb. 12, 2017].
International Search Report and Written Opinion—PCT/US2018/029171—ISA/EPO—dated Jul. 18, 2018 16 pages.
Huawei, et al., "Resource Allocation for UE-to-Network Relay," 3GPP Draft; R1-151279, 3rd Generation Partnership Project (3GPP), Mobile Competence Centre; 650, Route Des Lucioles; F-06921 Sophia-Antipolis Cedex; France, vol. RAN WG1, No. Belgrade, Serbia; Apr. 20, 2015-Apr. 24, 2015, Apr. 19, 2015, XP050934159, 3 pages, Retrieved from the Internet: URL: http://www.3gpp.org/ftp/Meetings_3GPP_SYNC/RAN1/Docs/ [retrieved on Apr. 19, 2015].

\* cited by examiner

RELAYING IN A DEVICE-TO-DEVICE COMMUNICATION SYSTEM

CROSS-REFERENCE TO RELATED APPLICATION(S)

This application claims the benefit of U.S. Provisional Application Ser. No. 62/502,339, entitled "RELAYING IN A DEVICE-TO-DEVICE COMMUNICATION SYSTEM" and filed on May 5, 2017, which is expressly incorporated by reference herein in its entirety.

BACKGROUND

The present disclosure relates generally to communication systems, and more particularly, to device-to-device (D2D) relay communication.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

For example, current implementation of D2D communication may inhibit a desired level of efficient operation with respect to power and resource utilization. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method for wireless communications at a relay user equipment (UE). The method may include receiving, on a downlink channel from a network entity, at least one indication including resource allocation information for at least one of the relay UE or a remote UE. The method may further include transmitting, on a sidelink channel to the remote UE, the resource allocation information of the remote UE.

In another aspect, a relay UE for wireless communication comprises a memory and a processor in communication with the memory. The processor may be configured to receive, on a downlink channel from a network entity, at least one indication including an resource allocation information for at least one of the relay UE or a remote UE. The processor may further be configured to transmit, on a sidelink channel to the remote UE, the resource allocation information of the remote UE.

In an additional aspect, a relay UE for wireless communication may include means for receiving, on a downlink channel from a network entity, at least one indication including resource allocation information for at least one of the relay UE or a remote UE. The relay UE may further include means for transmitting, on a sidelink channel to the remote UE, the resource allocation information of the remote UE.

In yet another aspect, a computer-readable medium storing computer executable code for wireless communications at a relay UE may include code for receiving, on a downlink channel from a network entity, at least one indication including resource allocation information for at least one of the relay UE or a remote UE. The computer-readable medium may further include code for transmitting, on a sidelink channel to the remote UE, the resource allocation information of the remote UE.

In an aspect, the present disclosure includes a method for wireless communications at a remote UE. The method may include receiving, on at least one sidelink channel, resource allocation information from a relay UE, the resource allocation information indicating one or more resources allocated for sidelink communication for the remote UE. The method may further include transmitting, on one or more sidelink channels, data to the relay UE in accordance with the one or more resources allocated for sidelink communication or the timing information.

In another aspect, the present disclosure includes a remote UE for wireless communication comprises a memory and a processor in communication with the memory. The processor may be configured to receive, on at least one sidelink channel, resource allocation information from a relay UE, the resource allocation information indicating one or more resources allocated for sidelink communication for the remote UE. The processor may further be configured to transmit, on one or more sidelink channels, data to the relay UE in accordance with the one or more resources allocated for sidelink communication.

In an additional aspect, a remote UE for wireless communication may include means for receiving, on at least one sidelink channel, resource allocation information from a relay UE, the resource allocation information indicating one or more resources allocated for sidelink communication for the remote UE. The apparatus further may include means for transmitting, on one or more sidelink channels, data to the relay UE in accordance with the one or more resources allocated for sidelink communication.

In yet another aspect, a computer-readable medium storing computer executable code for wireless communications at a remote UE may include code for receiving, on at least one sidelink channel, resource allocation information from a relay UE, the resource allocation information indicating one or more resources allocated for sidelink communication for the remote UE. The computer-readable medium may further include transmitting, on one or more sidelink channels, data to the relay UE in accordance with the one or more resources allocated for sidelink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
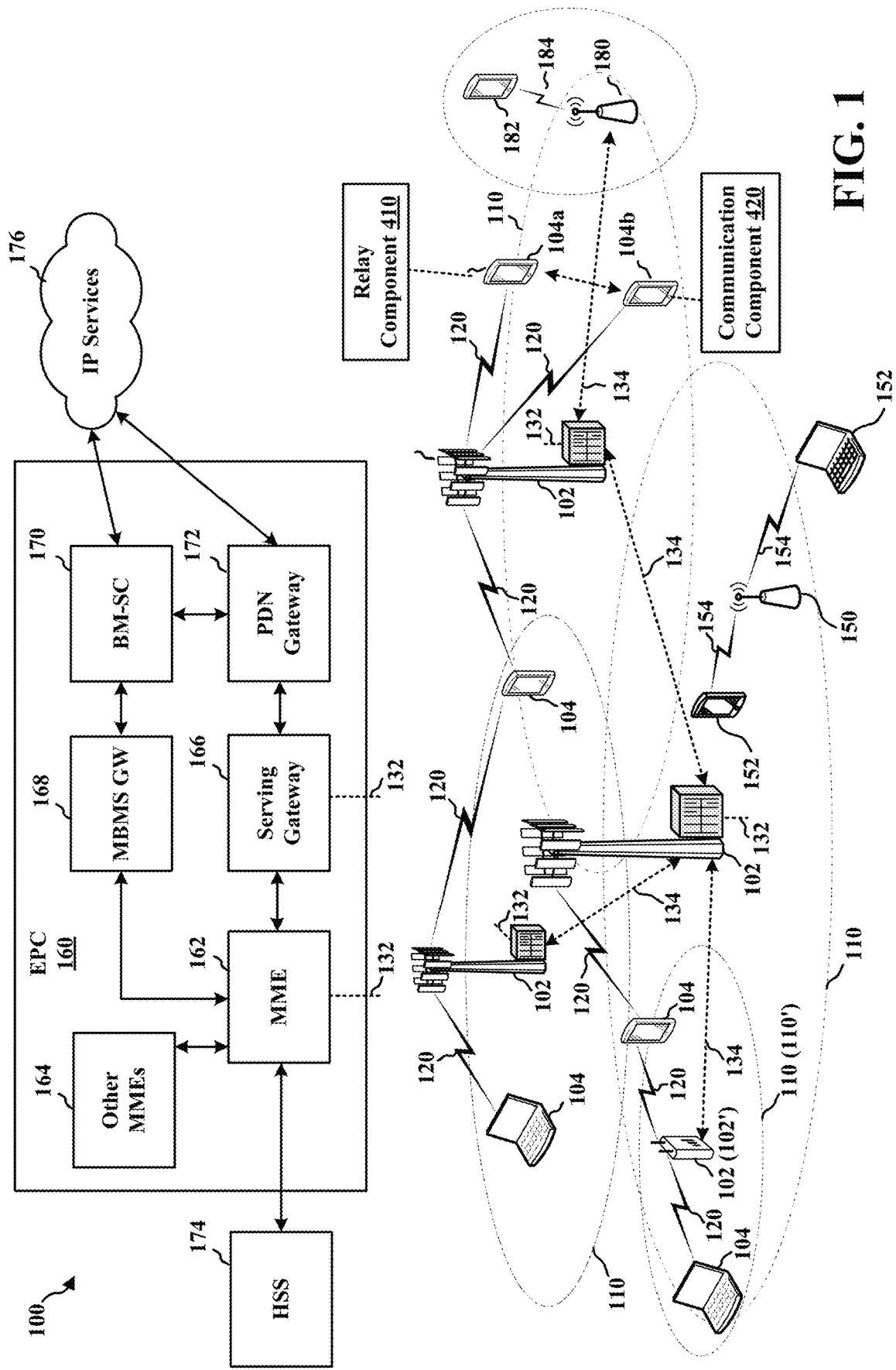
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. For example, UE 104*a* and UE 104*b* may be communicating via a device-to-device (D2D). D2D communication may be used to provide direct communication between devices such as UEs. D2D communication enables one device to communicate with another device and transmit data to the other device over allocated resources. In an aspect, the UE 104*a* may include relay component 410 configured to relay information from the base station 102 to the UE 104*b* and/or from the UE 104b to the base station 102. Further, in an aspect, the UE 104b may include communication component 420 configured to facilitate sidelink communication with the UE 104a. In some aspects, one or both of the UE 104a and/or 104b may be in a connected state with base station 102. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform congestion control based on an energy-based channel busy ratio and/or a decode-based channel busy ratio and to control packet transmission based on packet priorities and a channel busy ratio (198).

Figure 2A:
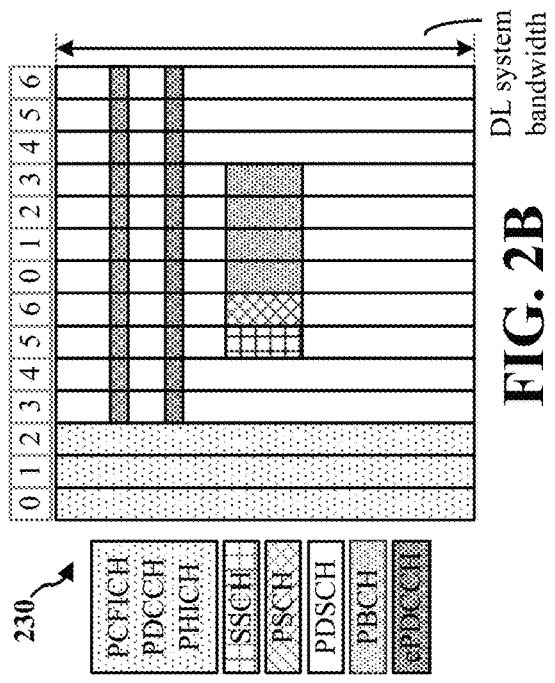
FIGS. 2A, 2B, 2C, and 2D are diagrams illustrating LTE examples of a DL frame structure, DL channels within the DL frame structure, an UL frame structure, and UL channels within the UL frame structure, respectively.
Figure 2B:
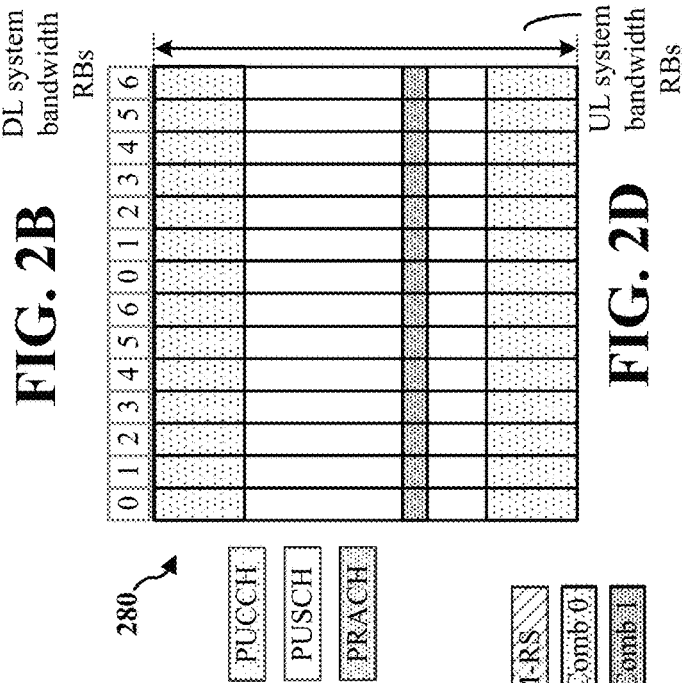
Figure 2C:
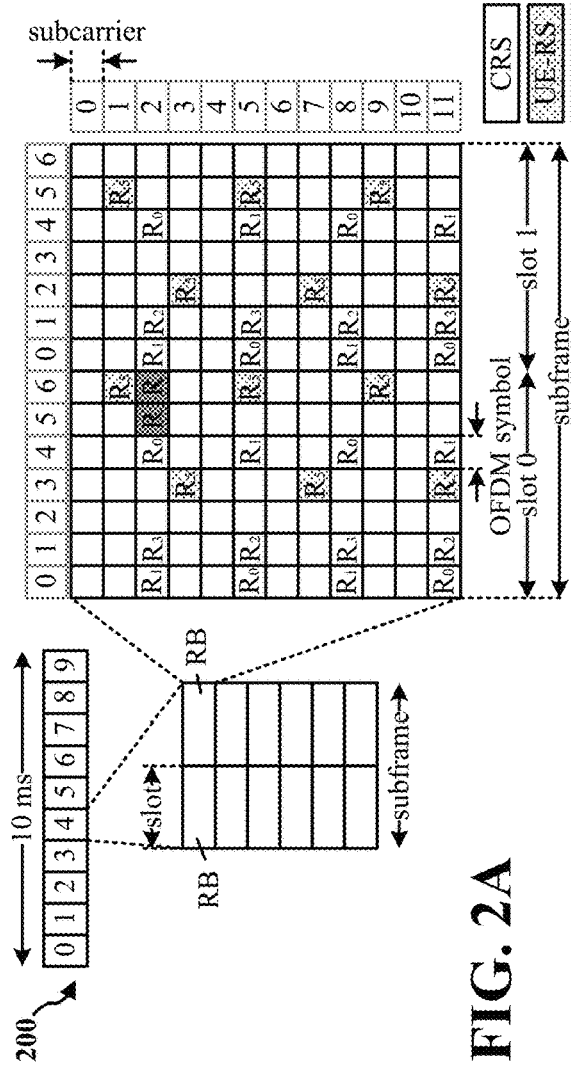
Figure 2D:
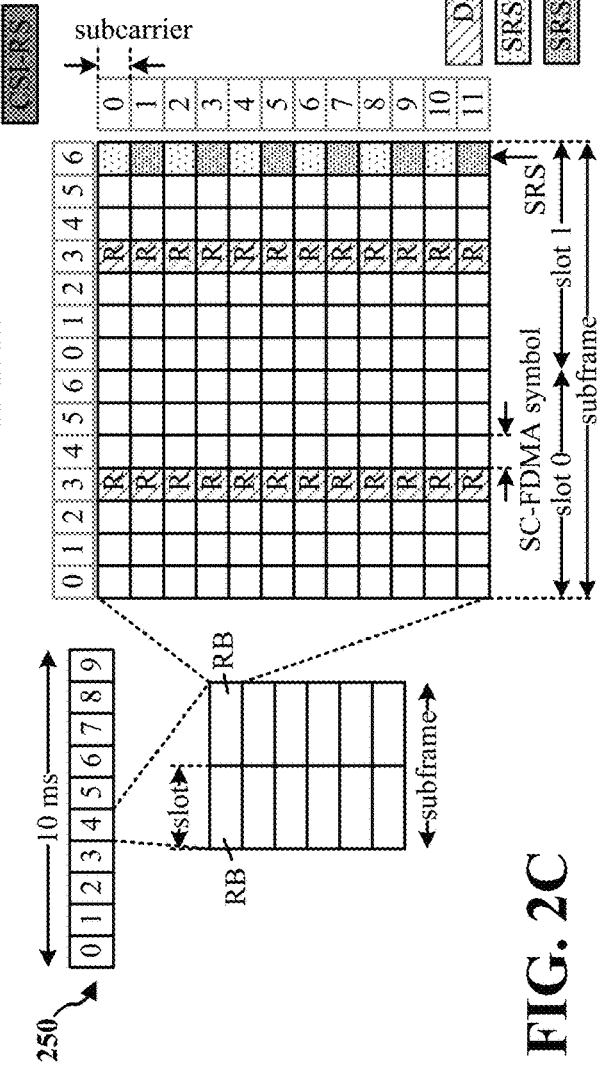

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
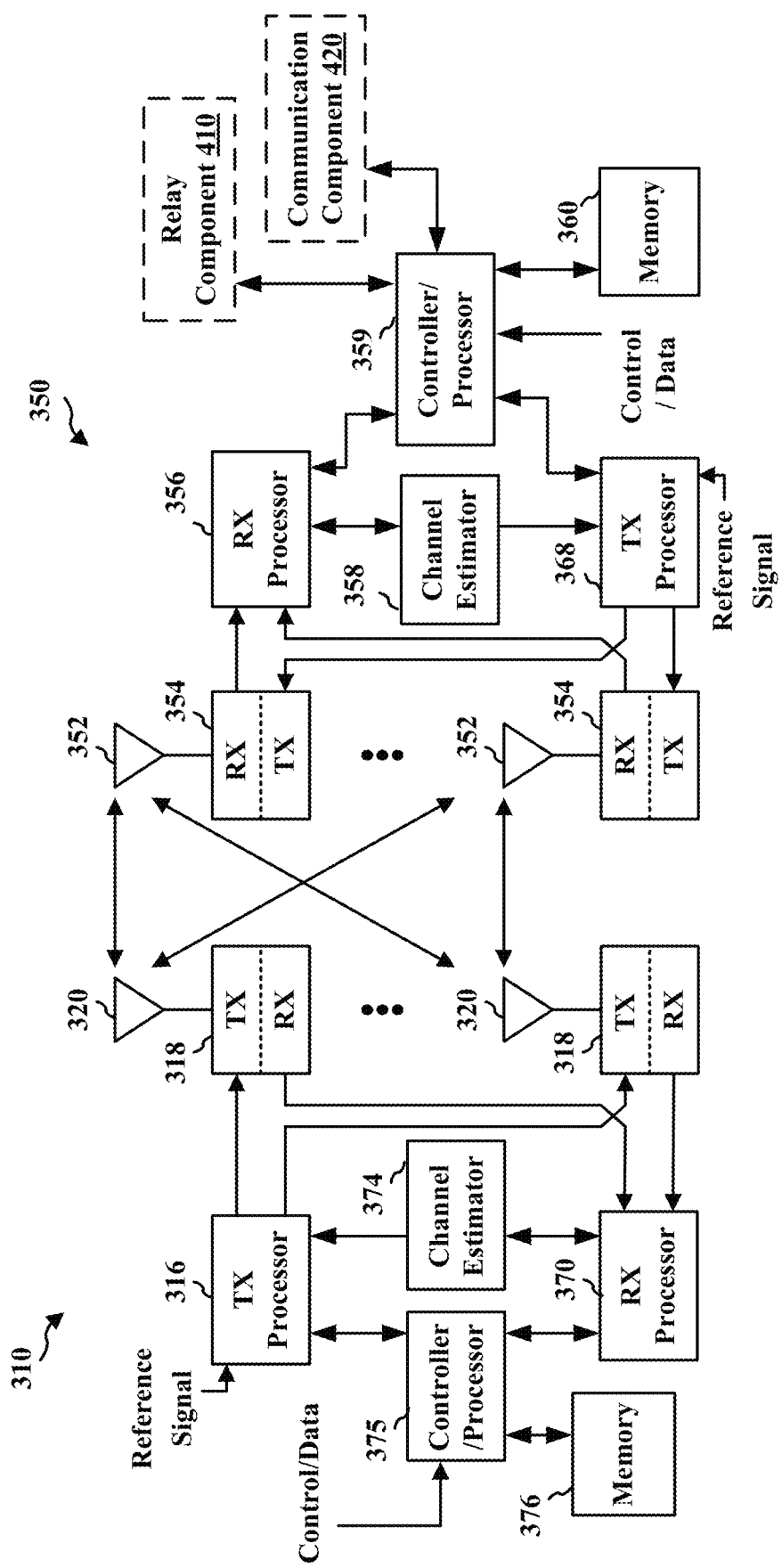
FIG. 3 is a diagram illustrating an example of an evolved Node B (eNB) and user equipment (UE) in an access network.

FIG. 3 is a block diagram of an eNB 310 in communication with a UE 350 in an access network. The UE 350 may include at least one of a relay component 410 configured to relay information from the eNB 310 to a remote UE and/or from the remote UE to the eNB 310, or a communication component 420 configured to facilitate sidelink communication with another UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/ processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
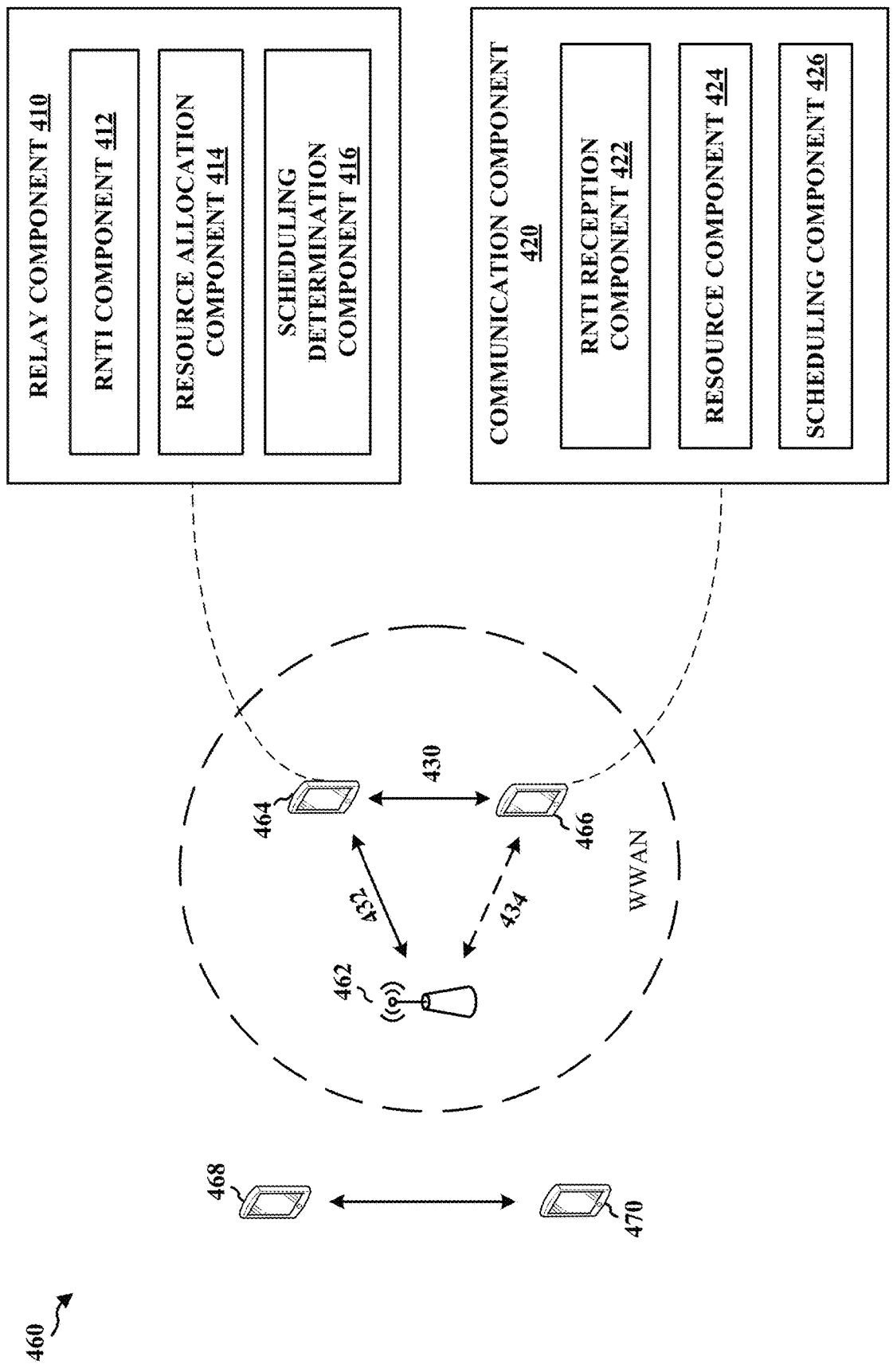
FIG. 4 is a diagram of a device-to-device communications system including a relay UE having a relay component and a remote UE having a communication component.

FIG. 4 is a diagram of a D2D communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462 (e.g., via communication links 432 and/or 434), and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels (e.g., sidelink channel 430), such as, but not limited to, a physical sidelink broadcast channel (PSBCH), a physical sidelink discovery channel (PSDCH), a physical sidelink shared channel (PSSCH), and a physical sidelink control channel (PSCCH).

The UE 464 may correspond to a relay UE and the UE 466 may correspond to a remote UE. The UE 464 may include the relay component 410, which may be configured to relay information from the base station 462 to the remote UE 466 and/or from the UE 466 to the base station 462. Further, the remote UE 466 may include communication component 420, which may be configured to facilitate sidelink communication with the relay UE 464.

In an aspect related to the RNTI component 412 at the UE 464 and the RNTI reception component 422 at the remote UE 466, one or more radio network temporary identifier (RNTIs) for D2D based bi-directional relating may be implemented. In some aspects, an RNTI is a physical layer identifier of the UE allocated by a base station (e.g., eNB). Specifically, a D2D relaying may provide efficiency in power and resource utilization. For instance, a remote UE such the remote UE 466 (e.g., smartwatch) may have limited batteries and/or power supply. When the remote UE 466 is communicating with the base station 462, the remote UE 466 may transmit at higher power (e.g., as opposed to communicating with the relay UE 464 on a sidelink). As such, when communicating with the relay UE such as the relay UE 464, the remote UE 466 may consume lower power for transmission and receptions. Hence, relaying assists with conserving power at the remote UE 466. Also, from a resource utilization point of view, the remote UE 466 may reuse at least some of the same resources between the relay UE 464 and the remote UE 466 by the base station 462, thereby increasing system capacity.

D2D relaying may include uni-directional relaying and/or bi-directional relaying. Uni-directional relaying may be used to relay only uplink traffic from the remote UE 466 to the base station 462 via the relay UE 464, while downlink traffic to the remote UE 466 may be transmitted directly to the remote UE 466. However, with bi-directional relaying, both uplink traffic from and downlink traffic to the remote UE 466 may be relayed by the relay UE 464 to/from the base station 462.

The remote UE 466 and the relay UE 464 may utilize a PC5 (D2D communication) interface for communication. Rel-12 and Rel-13 D2D communication may be based on a fixed number of retransmissions and transmission power based on an open loop power control with respect to the base station 462. However, such approach may not utilize feedback from other UEs to adjust a number of retransmissions and transmission power.

The remote UE 466. which may correspond to a remote UE typically, may only have a single receiver (Rx) chain, and as such, may only be tuned to or otherwise listen to the base station 462 or the relay UE 464. For example, in one instance, the remote UE 466 may be tuned to the relay UE 464, but the base station 462 may be controlling the resources allocated to one or both of the relay UE 464 and/or remote UE 466 for sidelink communication. Accordingly, it may be desirable to have the relay UE 464 relay RNTI information to the UE 466 on at least one sidelink channel 430.

For example, to allocate resources and during connection setup, the base station 462 may provide one or more RNTIs to the relay UE 464 and may also indicate to the remote UE 466 to establish a sidelink (e.g., PC5) connection with relay UE 464. As such, the base station 462 may control, via RRC messaging, when the remote UE 466 is listening to the relay UE 464 or when the remote UE 466 is listening to the UE 464 (e.g., when sidelink is disconnected, remote UE 466 will automatically connect to eNB for at least downlink communication). In some aspects, although the remote UE 466 is no longer listening to the base station 462, the remote UE 466 and the base station 462 may maintain a logical connection even when the remote UE 466 is connected to the relay UE 464.

The relay UE 464 may receive the one or more RNTIs, which may include an RNTI of the relay UE 464 and an RNTI of the remote UE 466. The UE 464 may perform scheduling of resources for the remote UE 466 based on the base stations 462 command. Specifically, for the RNTI of the UE relay 464, the relay UE 464 may decode the physical downlink control channel (PDCCH) to determine whether there a downlink and/or uplink grant has been allocated by the base station 462. Similarly, for the RNTI of the remote UE 466, the relay UE 464 may decode the PDCCH to determine whether a grant of sidelink resources has been allocated for the remote UE 466. Based on determining that a grant of sidelink resources has been provided for the remote UE 466, the relay UE 464 may forward the grant or associated RNTI to the remote UE 466 to facilitate bi-directional communication on the sidelink.

In some aspects, the base station 462 may provide a single RNTI for each remote UE 466 that is connected with relay UE 464, or may provide a bulk RNTI for all remote UEs 466 connected with the relay UE 464. For example, the relay UE 464 may monitor PDCCH for RNTI's of remote UEs 466, in addition to the relay UE's 464 own RNTI. Specifically, a bulk RNTI may be received by the relay UE 464. In such instance, the downlink control information (DCI) may distinguish the remote UEs including the remote UE 466. Indexing may be performed using RRC connection setup of remote UEs. The bulk RNTI message may include an index to the remote UEs. In some aspects, the index may have been pre-negotiated between the base station 462 and the relay UE 464 in an RRC message. Further, for each remote UE identifier, there may be an index assigned to each remote UE. Based on the index, the relay UE 464 may determine the remote UE identifier for which the grant is allocated.

In the case where a single RNTI may be determined and forwarded to a corresponding remote UE 466, the relay UE 464 may obtain the single RNTI associated with the remote UE 466 for determining the sidelink grant allocated by the base station 462 for the remote UE 466. The relay UE 464 may perform such procedure for each distinct RNTI associated with different remote UEs. As such, in either case, the relay UE 464 receives an indication including one or more RNTIs of remote UEs 466, and based on the indication, the relay UE 464 may decode PDCCH from the base station 462 to obtain the grant, and passes the grant onto the remote UE 466.

In some aspects, the relay UE 464 may be a high capability UE (e.g., smartphone) in terms of battery and capacity (e.g., may support MIMO, carrier aggregation, etc.). Further, the remote UE 466 may be a low capability device (e.g., smartwatch) with respect to battery and communication capabilities.

In some aspects, the relay UE 464 and the remote UE 466 may be associated with each other. For example, the relay UE 464 and the remote UE 466 may be associated with a single or same subscriber or operator subscription. Further, during connection establishment, the base station 462 may possess the association information (e.g., devices share same subscription)

In an aspect related to the resource allocation component 414 at the relay UE 464 and the resource component 424 at the remote UE 466, eNB-assisted resource allocation for sidelink communication between the remote UE 466 and the relay UE 464 may be provided. For example, D2D communication may include two modes of resource allocation for sidelink communication: (i) UE autonomous, and (ii) eNB-based (e.g., base station 462). In the case of UE autonomous resource allocation, the eNB may set aside resource pools to be used for sidelink communication and the UE may autonomously (e.g., randomly and/or based on distributed sensing based MAC) select the resources within the pool for transmissions. In the case of eNB-based resource allocation, the UE requests the eNB for a resource and the eNB grants the resources to the UE. For out-of-coverage sidelink operations, resource selection may always be UE autonomous.

For the case of a remote UE 466 (e.g., which may be a wearable device), the remote UE 466 may either not be in-coverage of the base station 462, or may be power limited and associated to a relay UE 464 to communicate to the base station 462. Thus, in addition to the above approaches (i.e., UE autonomous and eNB-based), the present aspects overcome such shortcomings such that the base station 462 may assign the resources for the remote UE 466 via the sidelink relay connection. An eNB-assisted resource allocation may provide better coexistence with regular uplink transmissions and improved link performance using centralized resource allocation.

Further, the remote UE 466 (e.g., wearable UE) may be bandwidth limited (e.g., capable of monitoring only six radio bearers within the channel bandwidth). Hence, if the base station 462 assigns a resource to the relay UE 464 for sidelink communication with the remote UE 466, the remote UE 466 may also need to be informed of the 6 PRB sub-pool to monitor for that transmission.

Additionally, if the remote UE 466 receives the DCI with resource allocation from the eNB such as base station 462 in subframe 'n', then the resource may be for the subframe 'n+4'. However, it may be desirable to have the eNB allocate a resource for the remote UE 466, but such information is relayed via a relay UE 464 via sidelink. So if conducted using DCI by the eNB, the 'n+4' may be modified as the relay UE 464 forwarding delay should be accounted.

In the case of a relayed link, the remote UE such as the remote UE 466 may not have a timing advance available from the eNB (e.g., no direct uplink link between remote and eNB). For eNB assigned/assisted resource allocation, it may still be desired to assign an appropriate timing advance for remote UE's transmission for better coexistence with other UL transmissions.

In one example, the eNB such the base station 462 may allocate resources (e.g., sidelink resources) to both the remote UE 466 and relay UE 464. The relay UE may then forward the resources to remote UE in a transparent manner. For example, the relay UE 464 may receive DCI for relaying UE resource (e.g., may be scrambled with relay UE 464's C-RNTI). Further, the relay UE 464 may receive DCI for remote UE resource, but the resource may be for time 'n+T', where 'n' is a subframe and 'T' may be a time value. In some aspects, 'T' may be RRC configured. Additionally, the configuration may be sidelink pool specific. In some aspects, T may be a fixed value such as eight (e.g., implemented when there are HARQ retransmissions).

The DCI may be scrambled with a remote-RNTI being monitored by the relay UE 464 for the purpose of relaying to either the remote UE 466, or a group of remote UEs associated with the relay UE 464. Further, the DCI may be transmitted as an enhanced physical downlink control channel (E-PDCCH) and may include 'T' as a parameter, i.e., T may be part of DCI.

The relay UE 464 may relay the DCI to the remote UE 466. In one instance, the DCI may be sent as sidelink control information (SCI) without any associated data. In another instance, the DCI may be sent as a MAC control element and part of sidelink link shared channel (SL-SCH) data. Additionally, a time 'X' after which the allocation applies may be determined such that n'+X=n+T, where n' is the subframe on which the DCI is relayed to the remote UE 466.

In another example, the eNB such as base station 462 may allocate bulk resources to the relay UE 464, and the relay UE 464 then sub-allocates and forwards the resources to the remote UE 466 in a transparent manner. For example, the base station 462 may transmit an initial resource allocation in accordance with a semi-persistent scheduling (SPS) configuration to the relay UE 464 for both the relay UE 464 and the remote UE 466 resources. The relay UE 464 may then sub-allocate resources from the SPS resources to the remote UE 466. In one instance, the relay UE 464 may allocate one resource at a time. In another instance, as a sub-SPS process, the relay UE 464 may first be informed of the periodicity and then transmit according to n'+X using DCI or a MAC CE.

In a further example, the resource pools for the remote UE 466 may be configured using RRC by the base station 462 (e.g., the RRC messages may be sent directly or indirectly via the relay UE 464). The resource pool may hop in frequency using predetermined pattern.

Further, to address the timing variance, the remote UE 466 may apply a timing advance to sidelink transmissions. In one example, the relay UE 464 may inform the remote UE 466 of the timing advance to apply. The timing advance may be derived in at least two manners. First, the relay UE 464 may inform the remote UE 466 of the timing advance of the relay UE 464. Such information may be sent as MAC CE or SCI. Second, the relay UE 464 may inform the remote UE 466 of the timing advance. For example, the timing advance may be the relay UE's own TA in addition to a correction (e.g., correction may be within the autonomous correction limit. Further, the timing advance of the relay UE's 464 timing advance in addition to the correction (e.g., correction may be within some limits configured by the eNB). Additionally, the correction may be based on any sidelink transmission from the remote UE 466 and the relay UE 464.

In another example, the remote UE 466 may derive the timing for sidelink transmission based on a sidelink synchronization signal (SLSS) transmitted by the relay UE 464. For example, the SLSS may be sent with an uplink timing by the relay UE 464. Further, the remote UE 466 may then follow the timing advance of the relay UE 464 with a correction as informed by the relay UE 464 and/or autonomous corrections made in its end. Additionally, the relay UE 464 can inform the remote UE 466 of the corrections to apply over the received SLSS timing at the remote UE 466 based on measurements over any sidelink transmission from the remote UE 466 to the relay UE 464.

In an aspect related to the scheduling determination component 416 at the relay UE 464 and the scheduling component 426 at the remote UE 466, scheduling requests (SRs) and buffer status reports (BSRs) on PC5 sidelink interface between the remote UE 466 and the relay UE 464 may be provided.

Some sidelink designs may not include any particular L2 MAC control signaling for peer UEs to facilitate scheduling. For the relay UE 464 to act as a L2 relay, the remote UE 466 may be visible to the base station 462. The remote UE 466 may be logically connected to the base station 462, but the base station 462 may not allocate physical resources for the remote UE 466. Thus, there may not be a need to have SR or BSR between the remote UE 466 and the base station 462 for scheduling purposes. However, as the remote UE 466 may still need to obtain resource allocated by the relay UE 464, signaling such as SR and BSR over the sidelink interface may be desirable. The present aspects provide an SR and BSR signaling scheme using at least two MAC CEs over the sidelink within an L1 or L2 signaling exchange in sidelink for direct resource allocation between the remote UE 466 and the relay UE 464.

For a mode 1 UE, the remote UE 466 may rely on the eNB to allocate PC5 sidelink resource dynamically. For a mode 2 UE, the remote UE 466 may read SIB 21 or use pre-configured sidelink resource to transmit its data over PC5 interface. However, for a UE that is neither in mode 1 nor in mode 2, the UE may be in a third mode where the eNB may not directly be involved in remote resource assignment over sidelink. From the remote UE 466 perspective, the sidelink resources may be assigned by the relay UE 464. In this case, scheduling requests may be transmitted on the sidelink between the remote UE 466 and relay UE 464.

For example, the D2D UEs may perform synchronous resource allocation for SR (or RTS). Unlike asynchronous on-demand RTS operation, the resource to send SR may be short and periodic. The resource may be used to support code-division multiplexing (CDM) such that multiple remote UEs including remote UE 466 can transmit in the resource at the same time. The relay UE 464 may discern the transmitter(s) or distinct remote UEs by identifying different code(s) used in the CDM scheme. In this SR, 1-bit of information may be transmitted by each remote UE as a request for relay-allocated resource to be used for sidelink operation.

The resources that are transmitted according to CDM for SR may be pre-allocated as periodic resources when the remote UE 466 is linked to the relay UE 464. The actual configuration for those resources may be determined either by the relay UE 464 or the eNB 462. If the eNB 462, RRC dedicated signaling or SIB may be used. Further, some of the PC5 data resources are statically configured as potential SR resources as part of PSDCH. Additionally, the SR response (CTS) may be generated by the relay UE 464 on-demand and may not use pre-assigned resources. If the relay UE 464 includes an SR response in a MAC CE within the DATA portion, the relay UE 464 may indicate the SR response in SCI preceding the DATA.

For the remote UE 466 linked to the relay 464, the BSR may be similar to an RTS of the relay UE. For example, the BSR may be transmitted as a MAC CE over the sidelink, the remote UE 466 may generate BSR (e.g., for sidelink buffer) and include the BSR as part of the "DATA" transmitted to the relay UE 464. However, the relay UE 464 may extract this part of DATA and discern the contents represented by the BSR message and adjust the scheduling decisions accordingly. To provide the relay UE 464 an indication that there is a BSR MAC CE in the DATA portion of the transmission, the SCI (L1 Signaling) transmitted preceding the data may include a flag to indicate such.

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
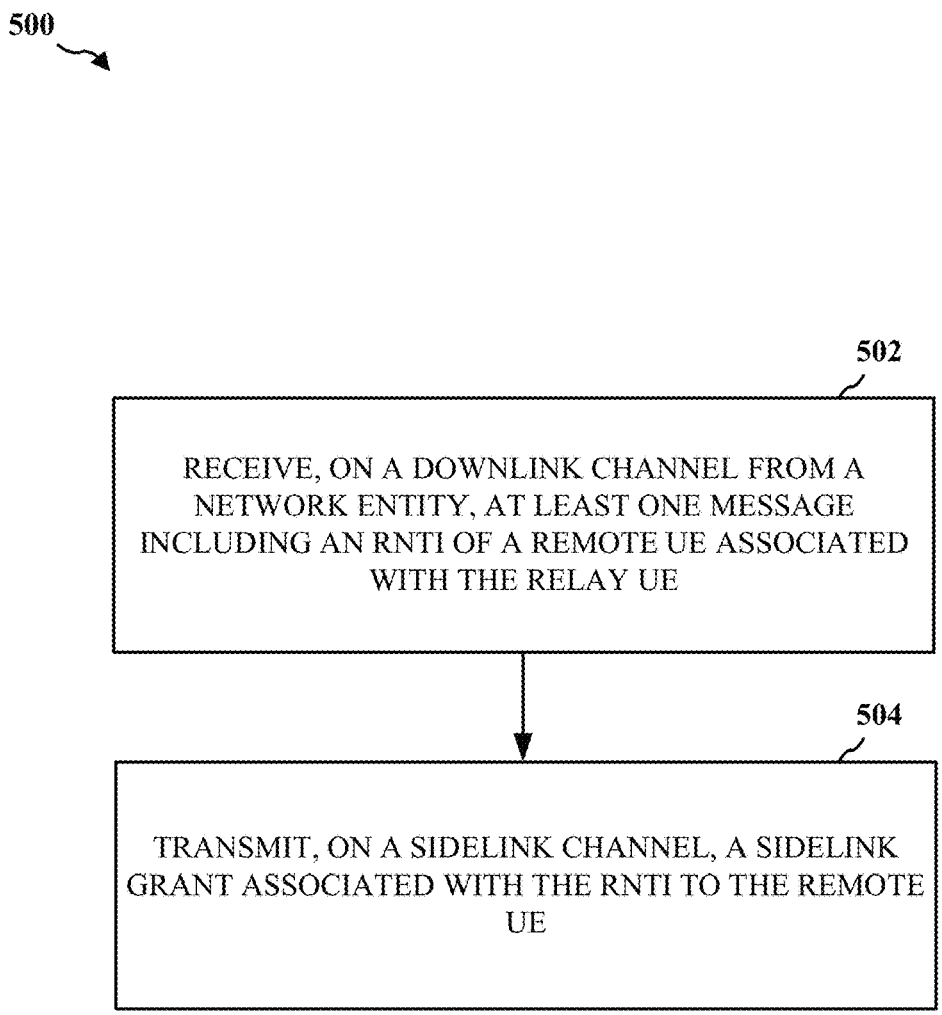
FIG. 5 is a flowchart of a method of relaying a radio network temporary identifier (RNTI) at a relay UE.

FIG. 5 is a flowchart 500 of a method of relaying an RNTI at a relay UE. The method may be performed by a UE (e.g., UE 464). At block 502, the method may receive, on a downlink channel from a network entity, at least one message including a RNTI of a remote UE associated with the relay UE. For example, as described herein, the relay UE 464 and/or the RNTI component 412 may execute the RNTI component 412 to receive, on a downlink channel (e.g., Uu interface) from a network entity (e.g., base station 462), at least one message including a RNTI of a remote UE 466 associated with the relay UE 464. At block 504, method may transmit, on a sidelink channel, a sidelink grant associated with the RNTI to the remote UE. For example, as described herein, the relay UE 464 and/or the RNTI component 412 may execute the RNTI component 412 to transmit, on a sidelink channel 430, a sidelink grant associated with the RNTI to the remote UE 466.

In some aspects, the message may include an index including one or more index values each associated with one of the RNTI of the remote UE 466 and one or more additional RNTIs of one or more distinct remote UEs. For example, the index may be a listing of a plurality of distinct index values each associated with an RNTI of a different remote UE. Although not shown, the method 500 may further determine an index value associated with the remote UE 466, identify/determine the RNTI of the remote UE 466 based on the index value, and determine the sidelink grant for the remote UE 466 based on the RNTI of the remote UE 466. In some aspects, the sidelink grant may be transmitted to the remote UE 466 on the sidelink channel 430 in accordance with a determination of the RNTI based on the index value.

In some aspects, determining the sidelink grant for the remote UE 466 may include decoding the downlink channel following reception of the message including the RNTI of the remote UE 466 to obtain the sidelink grant for the remote UE 466 associated with the RNTI of the remote UE 466. In some aspects, the downlink channel may corresponds to a PDCCH. In some aspects, the method may further establish the sidelink channel 430 with the remote UE 466, the sidelink channel 430 corresponding to a PC5 interface. In some aspects, the remote UE 466 may share an operator subscription with the relay UE 464. In some aspects, the RNTI of the remote UE 466 may be associated with a grant of radio resources on the sidelink channel 430. In some aspects, the relay UE 464 may be a high capability UE and the remote UE 466 may be a low capability UE.

Figure 6:
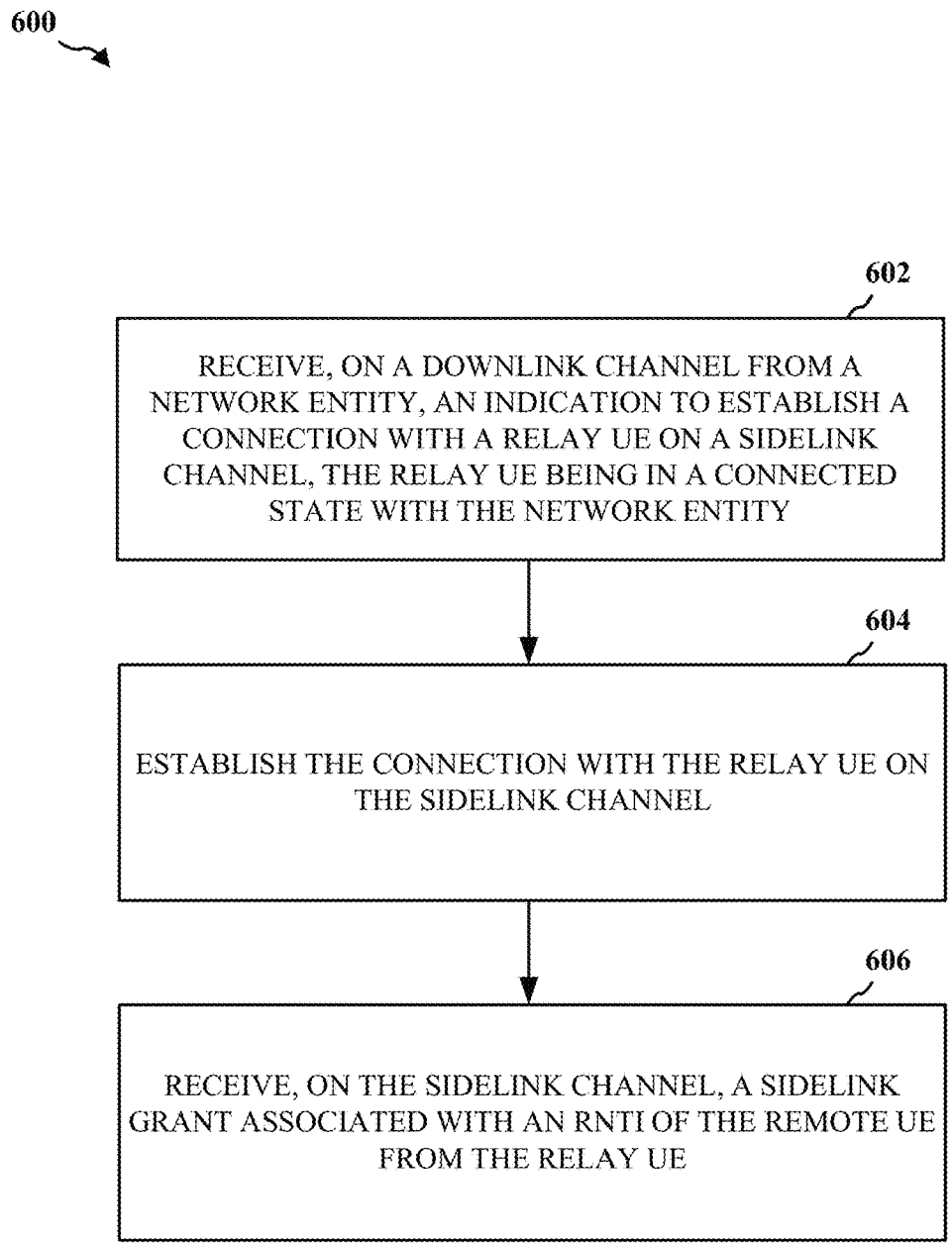
FIG. 6 is a flowchart of a method of RNTI reception at a remote UE.

FIG. 6 is a flowchart 600 of a method of RNTI reception at a remote UE. The method may be performed by a UE (e.g., UE 466). At block 602, the method may receive, on a downlink channel from a network entity, an indication to establish a connection with a relay UE on a sidelink channel, the relay UE being in a connected state with the network entity. For example, as described herein, the remote UE 466 and/or the communication component 420 may execute the RNTI reception component 422 to receive, on a downlink channel from a network entity (e.g., base station 462), an indication to establish a connection with a relay UE 464 on a sidelink channel 430, the relay UE 464 being in a connected state with the network entity.

At block 604, the method may establish the connection with the relay UE on the sidelink channel. For example, as described herein, the remote UE 466 and/or the communication component 420 may execute the RNTI reception component 422 to establish the connection with the relay UE 466 on the sidelink channel 430. At block 606, the method may receive, on the sidelink channel 430, a sidelink grant associated with an RNTI of the remote UE from the relay UE. For example, as described herein, the remote UE 466 and/or the communication component 420 may execute the RNTI reception component 422 to receive, on the sidelink channel 430, a sidelink grant associated with an RNTI of the remote UE 466 from the relay UE 464.

In some aspects, the sidelink channel 430 may correspond to a PC5 interface. In some aspects, the remote UE 466 may share an operator subscription with the relay UE 464. In some aspects, the sidelink grant provides radio resources for bi-directional communication on the sidelink channel 430. In some aspects, the relay UE 464 may be a high capability UE and the remote UE 466 may be a low capability UE.

Figure 7:
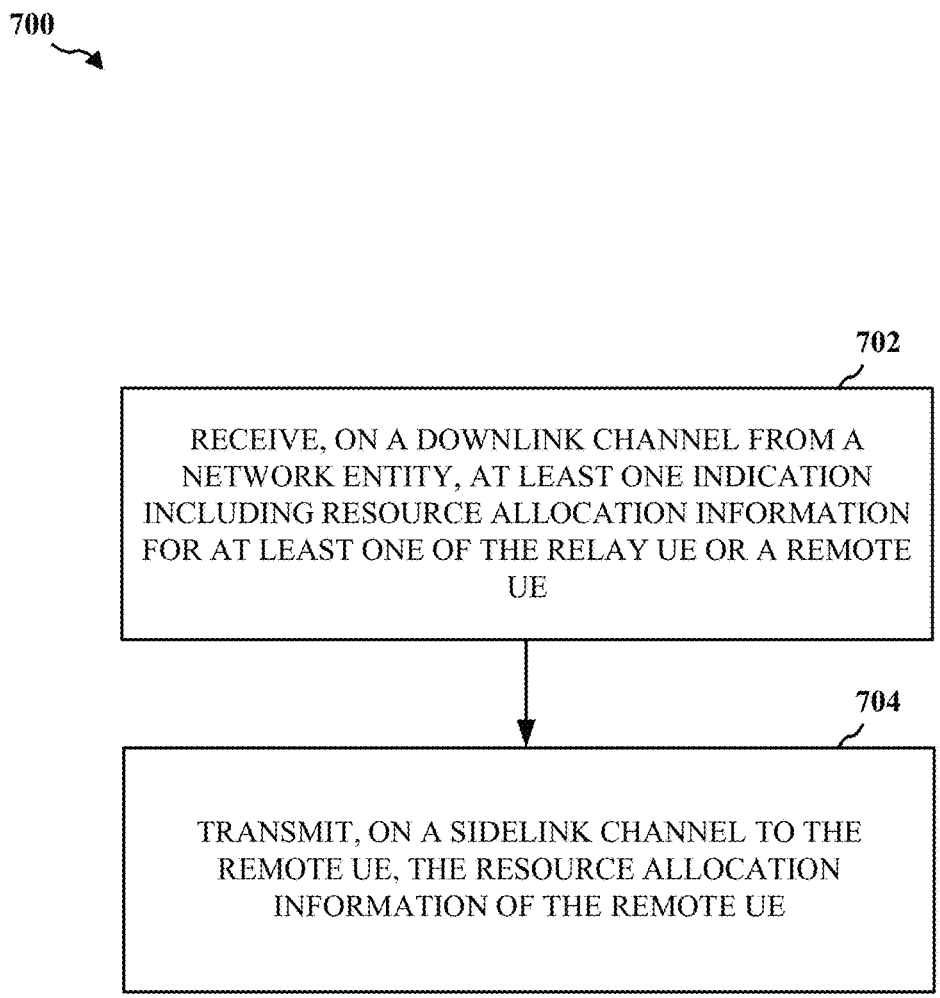
FIG. 7 is a flowchart of a method of resource allocation at a remote UE.

FIG. 7 is a flowchart 700 of a method of resource allocation at a relay UE. The method may be performed by a UE (e.g., UE 464). At block 702, the method may receive, on a downlink channel from a network entity, at least one indication including resource allocation information for at least one of the relay UE or a remote UE. For example, as described herein, the relay UE 464 and/or the relay component 410 may execute the resource allocation component 414 to receive, on a downlink channel from a network entity (e.g., base station 462), at least one indication including resource allocation information for at least one of the relay UE 464 or a remote UE 466. At block 704, the method may transmit, on a sidelink channel to the remote UE, the resource allocation information of the remote UE. For example, as described herein, the relay UE 464 and/or the relay component 410 may execute the resource allocation component 414 to transmit, on a sidelink channel 430, the resource allocation information to the remote UE 466.

In some aspects, the resource allocation information may correspond to DCI including resource allocation for at least one of the relay UE 464 or the remote UE 466 at a first time value representing a subframe slot plus a first time variable associated with the resource allocation. In some aspects, the time variable may correspond at least one of a fixed value or a RRC configured value. In some aspects, the DCI may be scrambled with at least a C-RNTI of the relay UE 464 or an RNTI of the remote UE 466. In some aspects, the DCI is transmitted via an E-PDCCH.

In some aspects, transmitting the resource allocation information to the remote UE 466 may include transmitting the DCI as SCI without associated data to the remote UE 466, and/or transmitting DCI as a MAC CE as part of the SL-SCH data. In some aspects, the DCI may be transmitted at a second time value representing the subframe slot plus a second time variable less than the first time variable. Although not shown, in some aspects, the method 700 may determine the second time variable such that the first time value plus the first time variable is the same as or equal to the second time value plus or in addition to the second time variable.

In some aspects, the resource allocation information may include or correspond to a bulk allocation of resources for one or more remote UEs including the remote UE 466 and associated with a SPS configuration. In some aspects, transmitting the resource allocation information to the remote UE may include allocating, for at least the remote UE 466, a single resource from the resources at a distinct time.

In some aspects, the indication may further includes a periodicity indication associated with an SPS-RNTI, the periodicity indication representing a repetition period for the bulk allocation of resources. In some aspects, transmitting the resource allocation information to the remote UE may include transmitting the DCI as SCI without associated data to the remote UE, or transmitting DCI as a MAC CE as part of the SL-SCH data.

In some aspects, although not shown, the method 700 may determine a first timing advance information, and transmit the first timing advance information to the remote UE 466. Further, in some aspects, determining the first timing advance information may include receiving, from a network entity, a second timing advance information for use in transmissions between the relay UE 464 and the network entity (e.g., base station 462), and setting the first timing advance information equal to the second timing advance information.

In some aspects, determining the first timing advance information may include receiving, from a network entity (e.g., base station 462), a second timing advance information for use in transmissions between the relay UE 464 and the network entity (e.g., base station 462), determining a timing offset based on a received timing of one or more sidelink channels (e.g., sidelink channel 430), and setting the first timing advance information as a function of the second timing advance information and the timing offset. Further, although not shown, in some aspects, the method 700 may further determine whether the timing offset is within at least one of a minimum limit or maximum limit, and adjust the timing offset to at least one of the minimum limit or the maximum limit.

In some aspects, at least one of the minimum limit or maximum limit may be within a fixed autonomous timing correction limit allowed by the network entity (e.g., base station 462). In some aspects, at least one of the minimum limit or maximum limit is received as an RRC configuration from a network entity (e.g., base station 462). In some aspects, the method may further transmit one or more sidelink synchronization signals to the remote UE 466 utilizing timing that corresponds to the first timing advance information.

Figure 8:
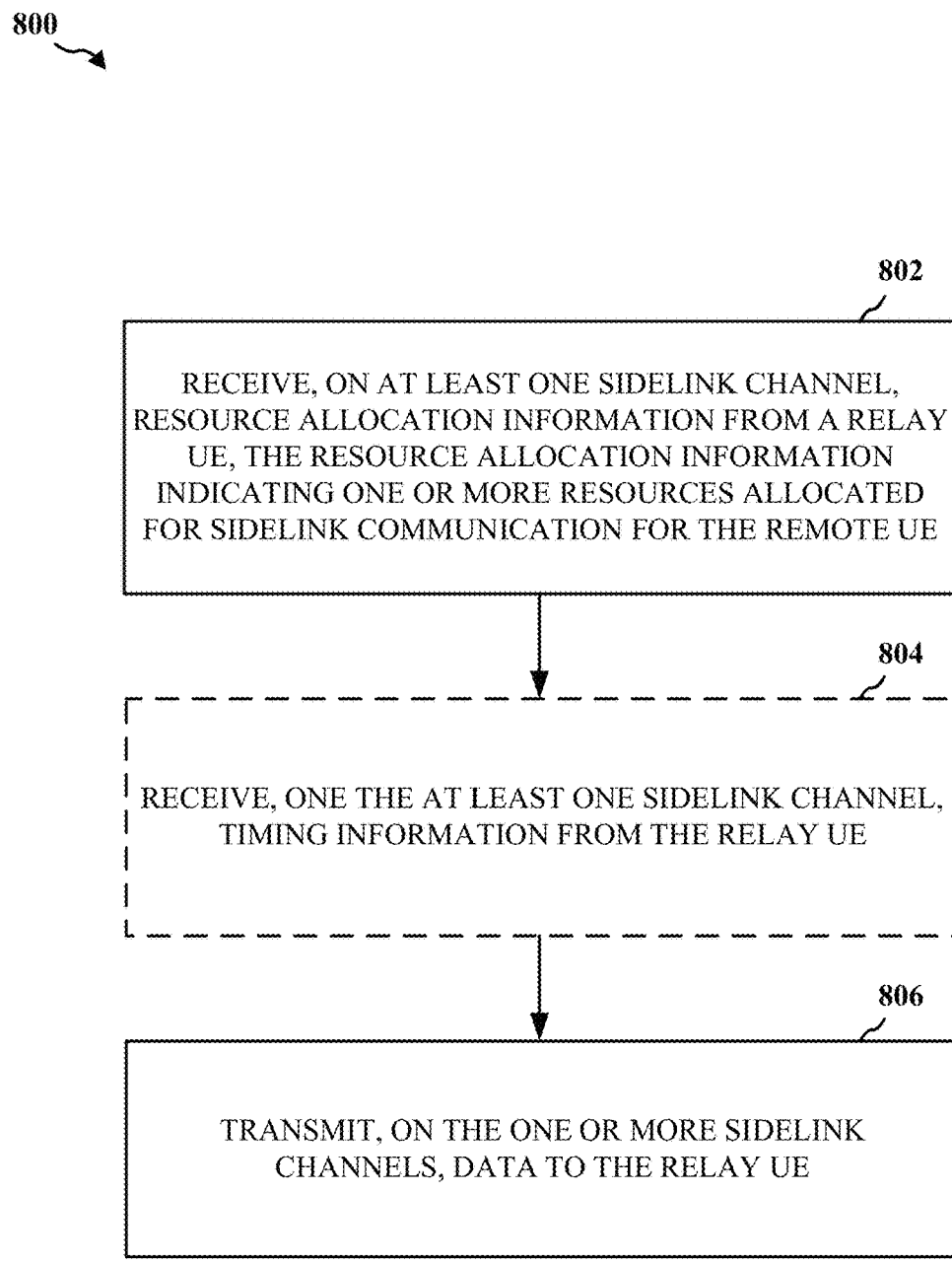
FIG. 8 is a flowchart of a method of resource allocation at a relay UE.

FIG. 8 is a flowchart 800 of a method of resource allocation at a remote UE. The method may be performed by a UE (e.g., UE 464). At block 802, the method may receive, on at least one sidelink channel, resource allocation information from a relay UE, the resource allocation information indicating one or more resources allocated for sidelink communication for the remote UE. For example, as described herein, the remote UE 466 and/or the communication component 420 may execute the resource component 424 to receive, on at least one sidelink channel 430, resource allocation information from a relay UE 464, the resource allocation information indicating one or more resources allocated for sidelink communication for the remote UE 466.

At block 804, the method may optionally receive, on the at least one sidelink channel, timing information from the relay UE. For example, as described herein, the remote UE 466 and/or the communication component 420 may execute the resource component 424 to receive, on the at least one sidelink channel 430, timing information from the relay UE 464. At block 708, the method may transmit, on one or more sidelink channels, data to the relay UE in accordance with at least one of the one or more resources allocated for sidelink communication or the timing information. For example, as described herein, the remote UE 466 and/or the communication component 420 may execute the resource component 424 to transmit, on one or more sidelink channels (e.g., sidelink channel 430), data to the relay UE 464 in accordance with at least one of the one or more resources allocated for sidelink communication or the timing information.

In some aspects, receiving the timing information may include receiving at least one of timing advance information of the relay UE 464 or timing advance information of the remote UE 466. In some aspects, receiving the timing information may include detecting a sidelink synchronization signal transmitted by the relay UE 464, and determining timing advance information based on the sidelink synchronization signal. In some aspects, the resource allocation information corresponds to at least one of one or more resources allocated by a network entity (e.g., base station 462) or the relay UE 464.

Figure 9:
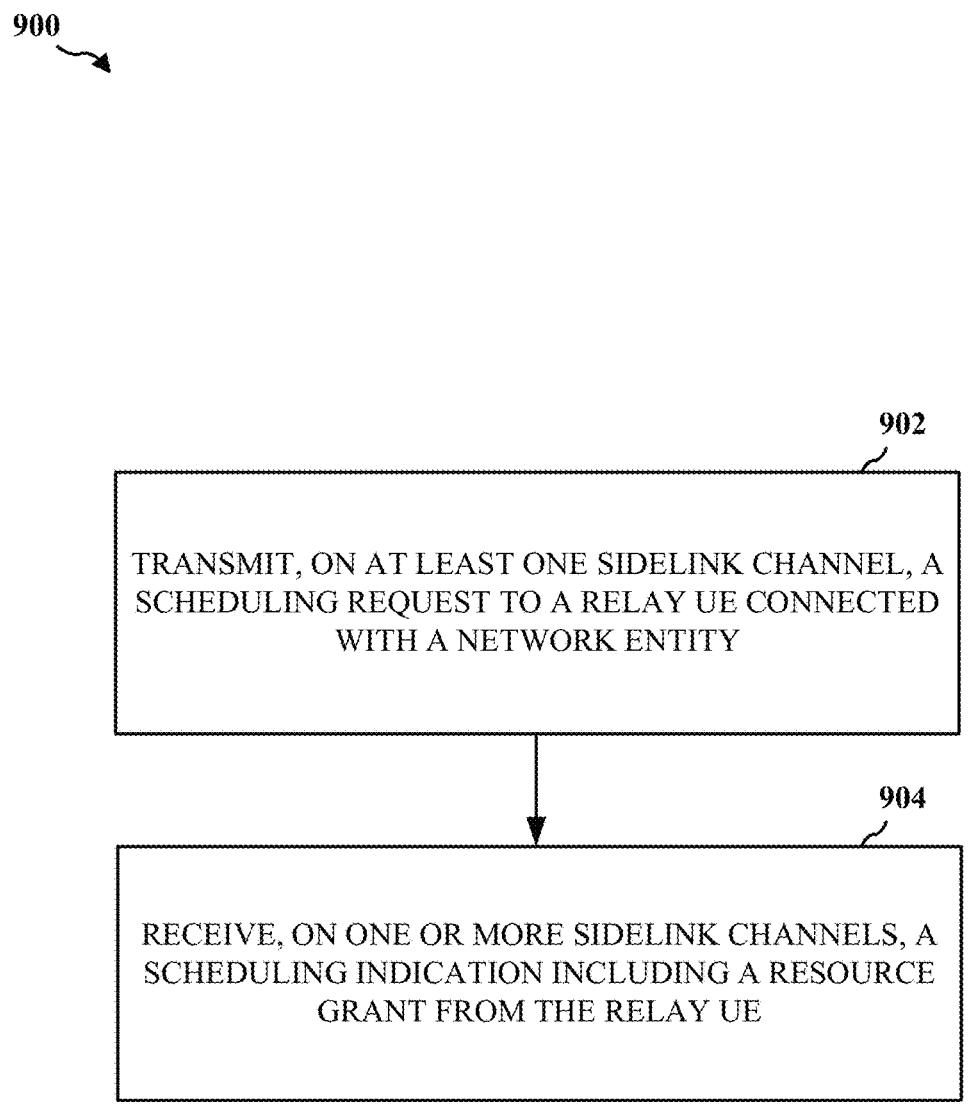
FIG. 9 is a flowchart of a method of wireless communication at a remote UE.

FIG. 9 is a flowchart 900 of a method of wireless communication at a remote UE. The method may be performed by a UE (e.g., UE 466). At block 902, the method may transmit, on at least one sidelink channel, a scheduling request to a relay UE connected with a network entity. For example, as described herein, the remote UE 466 and/or the communication component 420 may execute the scheduling component 426 to transmit, on at least one sidelink channel 430, a scheduling request to a relay UE 464 connected with a network entity (e.g., base station 462).

At block 904, the method may receive, on one or more sidelink channels, a scheduling indication including a resource grant from the relay UE in response to transmitting the scheduling request. For example, as described herein, the remote UE 466 and/or the communication component 420 may execute the scheduling component 426 to receive, on one or more sidelink channels (e.g., sidelink channel 430), a scheduling indication including a resource grant from the relay UE 464 in response to transmitting the scheduling request.

In some aspects, the resource grant may correspond to an allocation of resources by the relay UE 464 on a sidelink interface for communication between the remote UE 466 and the relay UE 464. In some aspects, the scheduling request may be transmitted according to a code-division multiplexing scheme. In some aspects, receiving the scheduling indication may include receiving SCI including an indication of an upcoming scheduling indication transmission, the indication being different from the scheduling indication and receiving the scheduling indication corresponding to a MAC CE within a data portion of a sidelink transmission from the relay UE 464.

In some aspects, the scheduling request may be transmitted on a periodic resource. Further, for instance, the periodic resource may be allocated when the remote UE links to the relay UE. In some aspects, the method may further transmit, on the at least one sidelink channel 430, SCI including a flag indicating an upcoming transmission of a buffer status report within a data portion of the upcoming transmission, and transmit, on the at least one sidelink channel 430, a buffer status report as a MAC CE within the data portion.

Figure 10:
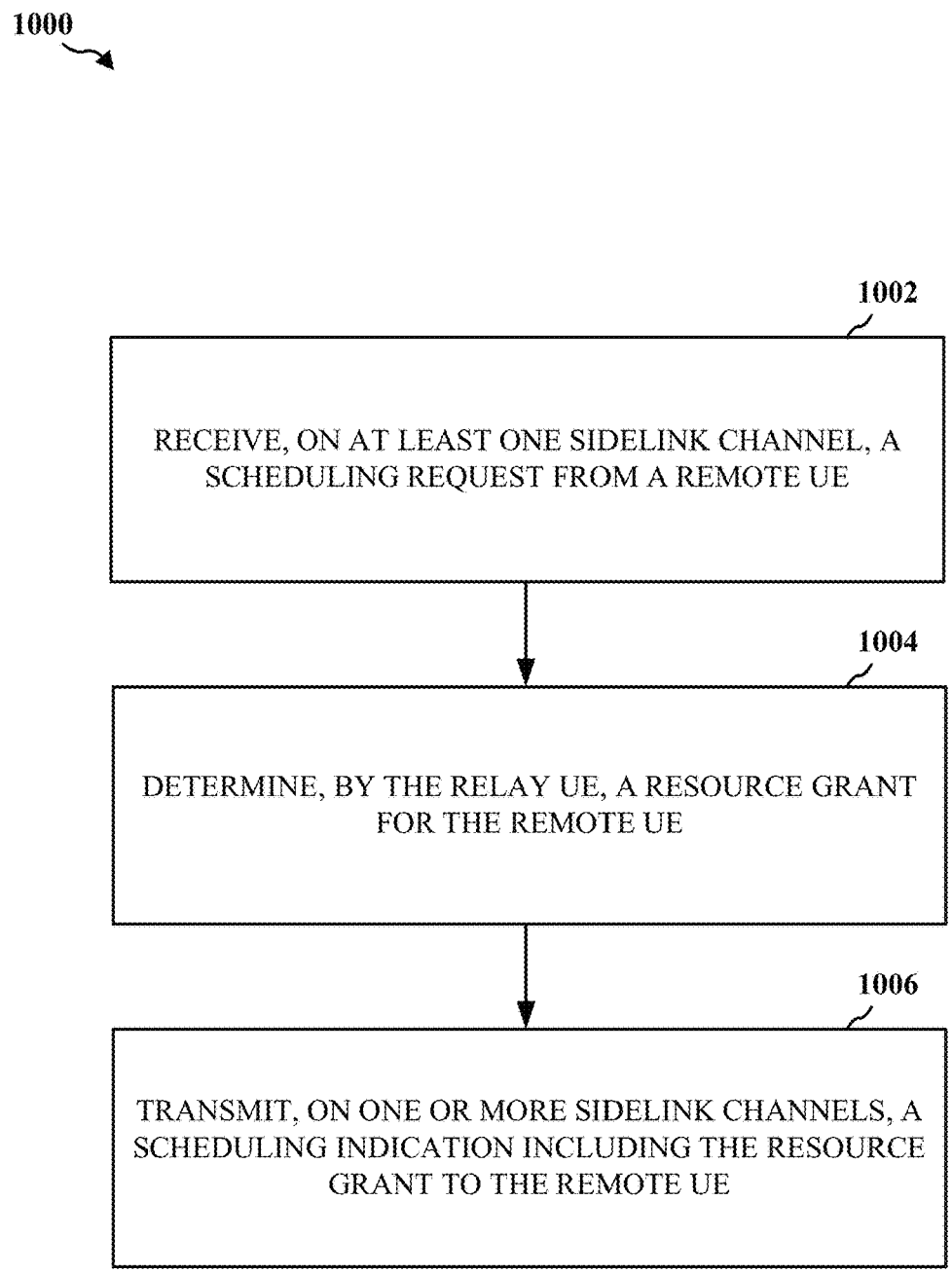
FIG. 10 is a flowchart of a method of scheduling resources at a relay UE.

FIG. 10 is a flowchart 1000 of a method of scheduling resources at a relay UE. The method may be performed by a UE (e.g., UE 464). At block 1002, the method may receive, on at least one sidelink channel, a scheduling request from a remote UE. For example, as described herein, the relay UE 464 and/or the relay component 410 may execute the scheduling determination component 416 to receive, on at least one sidelink channel 430, a scheduling request from a remote UE 466. At block 1004, the method may determine, by the relay UE, a resource grant for the remote UE in response to receiving the scheduling request. For example, as described herein, the relay UE 464 and/or the relay component 410 may execute the scheduling determination component 416 to determine, by the relay UE 464, a resource grant for the remote UE 466 in response to receiving the scheduling request. At block 1006, the method may transmit, on one or more sidelink channels, a scheduling indication including the resource grant to the remote UE. For example, as described herein, the relay UE 464 and/or the relay component 410 may execute the scheduling determination component 416 to transmit, on one or more sidelink channels (e.g., sidelink channel 430), a scheduling indication including the resource grant to the remote UE 466.

In some aspects, the scheduling request may be received on a periodic resource in accordance with a code-division multiplexing scheme. In some aspects, the method may further receive, on the sidelink channel 430, another scheduling request from a distinct remote UE on the periodic resource, identify at least one first code associated with the remote UE 466 used in the code-division multiplexing scheme and at least one second code associated with the distinct remote UE used in the code-division multiplexing scheme, the at least one first code being different from the at least one second code, determine a resource grant for the distinct remote UE based on identifying the at least one second code associated with the distinct remote UE, and transmitting, to the remote UE 466 on the one or more sidelink channels (e.g., sidelink channel 430), another scheduling indication including the resource grant for the remote UE 466.

In some aspects, transmitting the scheduling indication may include transmitting, to the remote UE 466 on the one or more sidelink channels (e.g., sidelink channel 430), the scheduling indication including the resource grant to the remote UE 466 based on a determination of the at least one first code associated with the remote UE 466. In some aspects, transmitting the scheduling indication may include transmitting SCI including an indication of an upcoming scheduling indication transmission to the remote UE 466, and transmitting the scheduling indication corresponding to a MAC CE within a data portion of a sidelink transmission to the remote UE 466. In some aspects, the method may further receive, from the remote UE 466 on the at least one sidelink channel 430, SCI including a flag indicating an upcoming transmission of a buffer status report within a data portion of the upcoming transmission, and receive, from the remote UE 466 on the at least one sidelink channel 430, a buffer status report as a MAC CE within the data portion.

Figure 11:
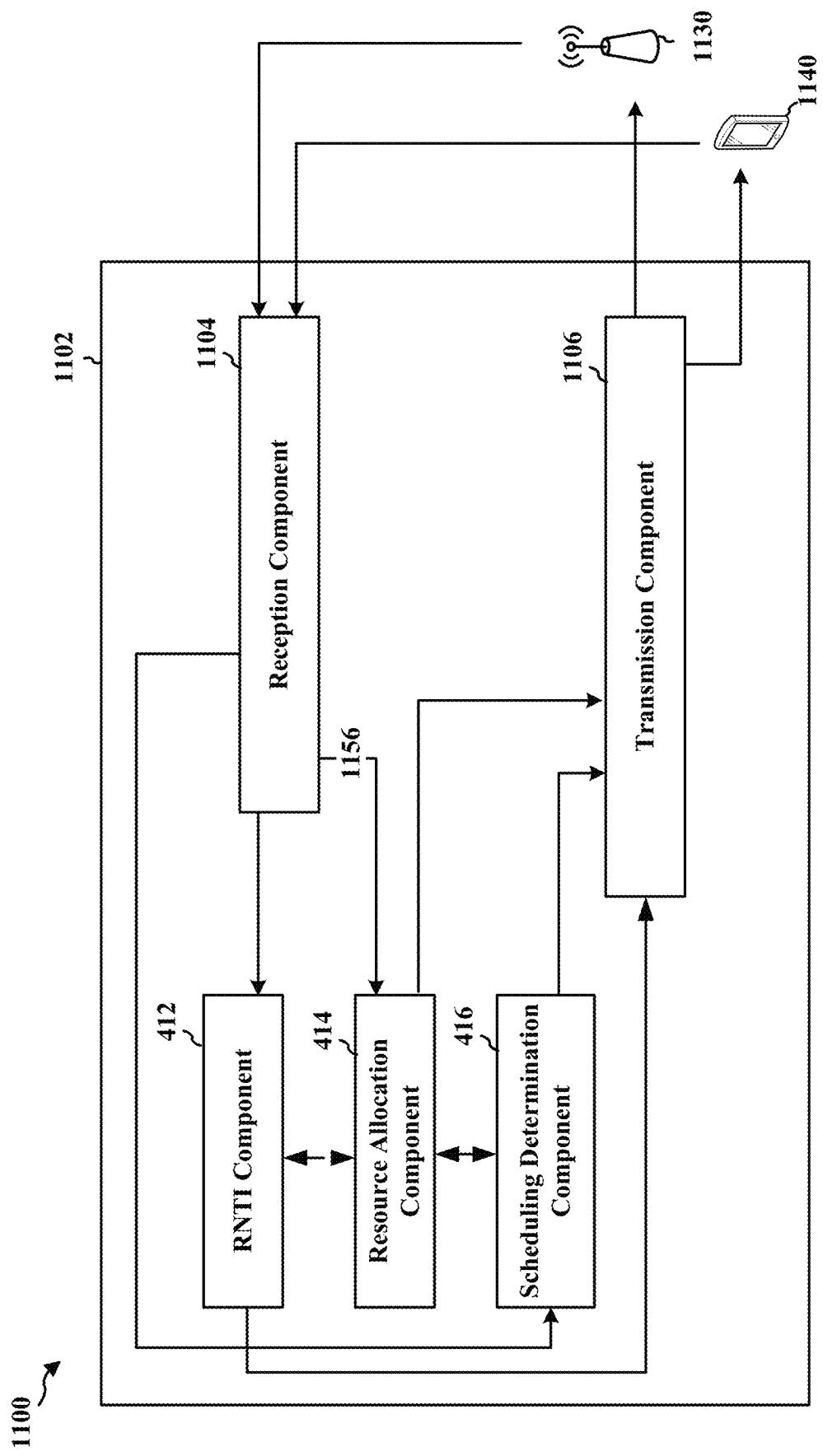
FIG. 11 is a conceptual data flow diagram illustrating the data flow between different means/components in an example apparatus such as a relay UE having a relay component.

FIG. 11 is a conceptual data flow diagram 1100 illustrating the data flow between different means/components in an exemplary apparatus 1102. The apparatus may be a relay UE. The apparatus includes a reception component 1104, a transmission component 1106, an RNTI component 412, a resource allocation component 414, and a scheduling determination component 416. The apparatus 1102 may receive communication from a base station 1130 via the reception component 1104, and may transmit communication to the base station 1130 via the transmission component 1106. Further, the apparatus 1102 may receive communication from a remote UE 1140 via the reception component 1104, and may transmit communication to the remote UE 1140 via the transmission component 1106. The RNTI component 412, the resource allocation component 414, and the scheduling determination component 416 may facilitate D2D communication as described herein with respect to FIG. 4.

The apparatus may include additional components that perform each of the blocks of the algorithm in the aforementioned flowcharts of FIGS. 5, 7, and 10. As such, each block in the aforementioned flowcharts of FIGS. 5, 7, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
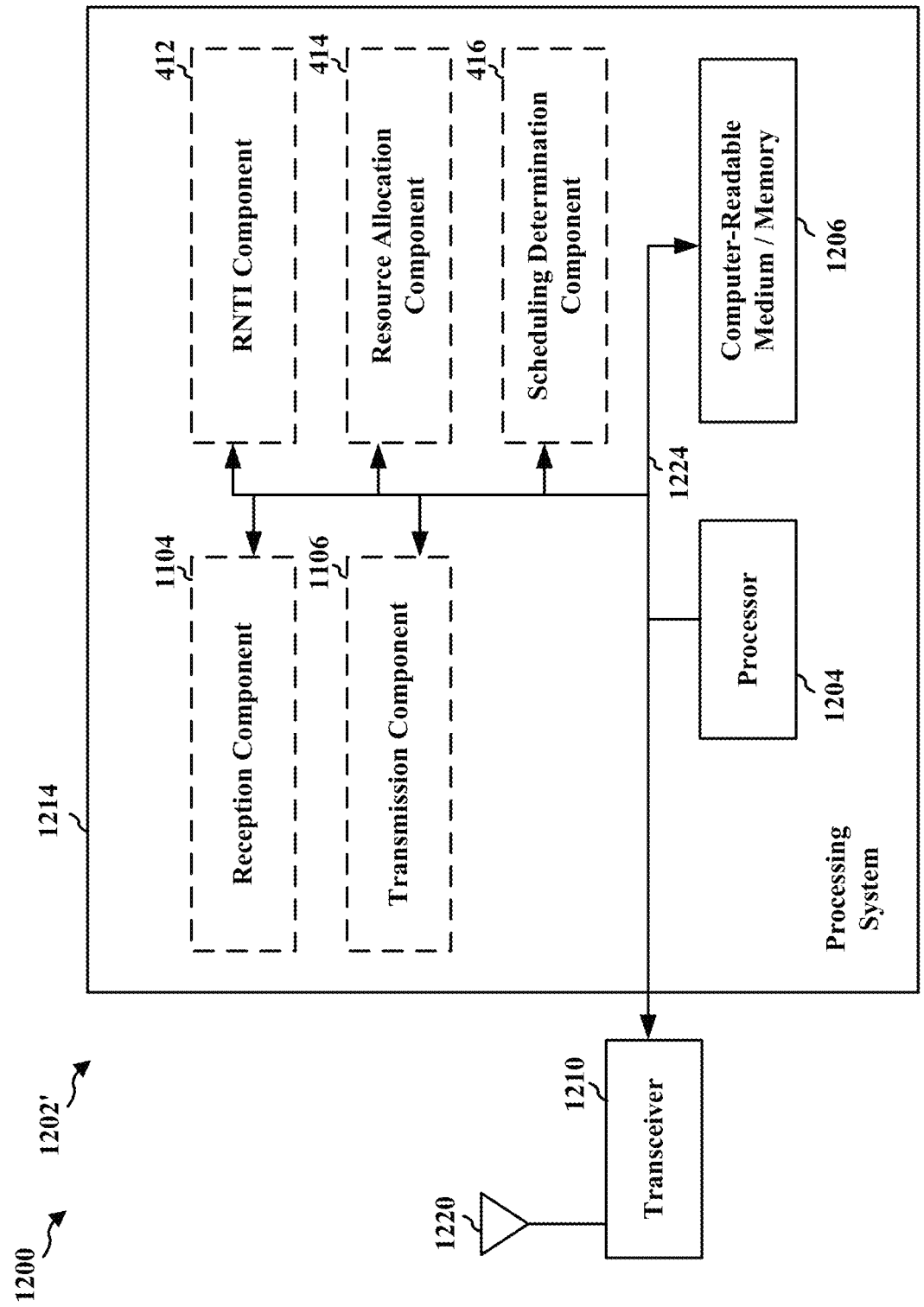
FIG. 12 is a diagram illustrating an example of a hardware implementation for an apparatus employing a processing system.

FIG. 12 is a diagram 1200 illustrating an example of a hardware implementation for an apparatus 1202' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 412, 414, 416, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 412, 414, and 416. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1202/1202' for wireless communication includes means for receiving, on a downlink channel from a network entity, at least one message including an RNTI of at least a remote UE associated with the relay UE, and means for transmitting, on a sidelink channel, a sidelink grant associated with the RNTI to the remote UE.

In another configuration, the apparatus 1202/1202' for wireless communication includes means for receiving, on a downlink channel from a network entity, at least one indication including resource allocation information for at least one of the relay UE or a remote UE, and means for transmitting, on a sidelink channel to the remote UE, the resource allocation information of the remote UE.

In an additional configuration, the apparatus 1202/1202' for wireless communication includes means for receiving, on at least one sidelink channel, a scheduling request from a remote UE, means for determining, by the relay UE, a resource grant for the remote UE, and means for transmitting, on or more sidelink channels, a scheduling indication including the resource grant to the remote UE.

The aforementioned means may be one or more of the aforementioned components of the apparatus 1102 and/or the processing system 1214 of the apparatus 1202' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
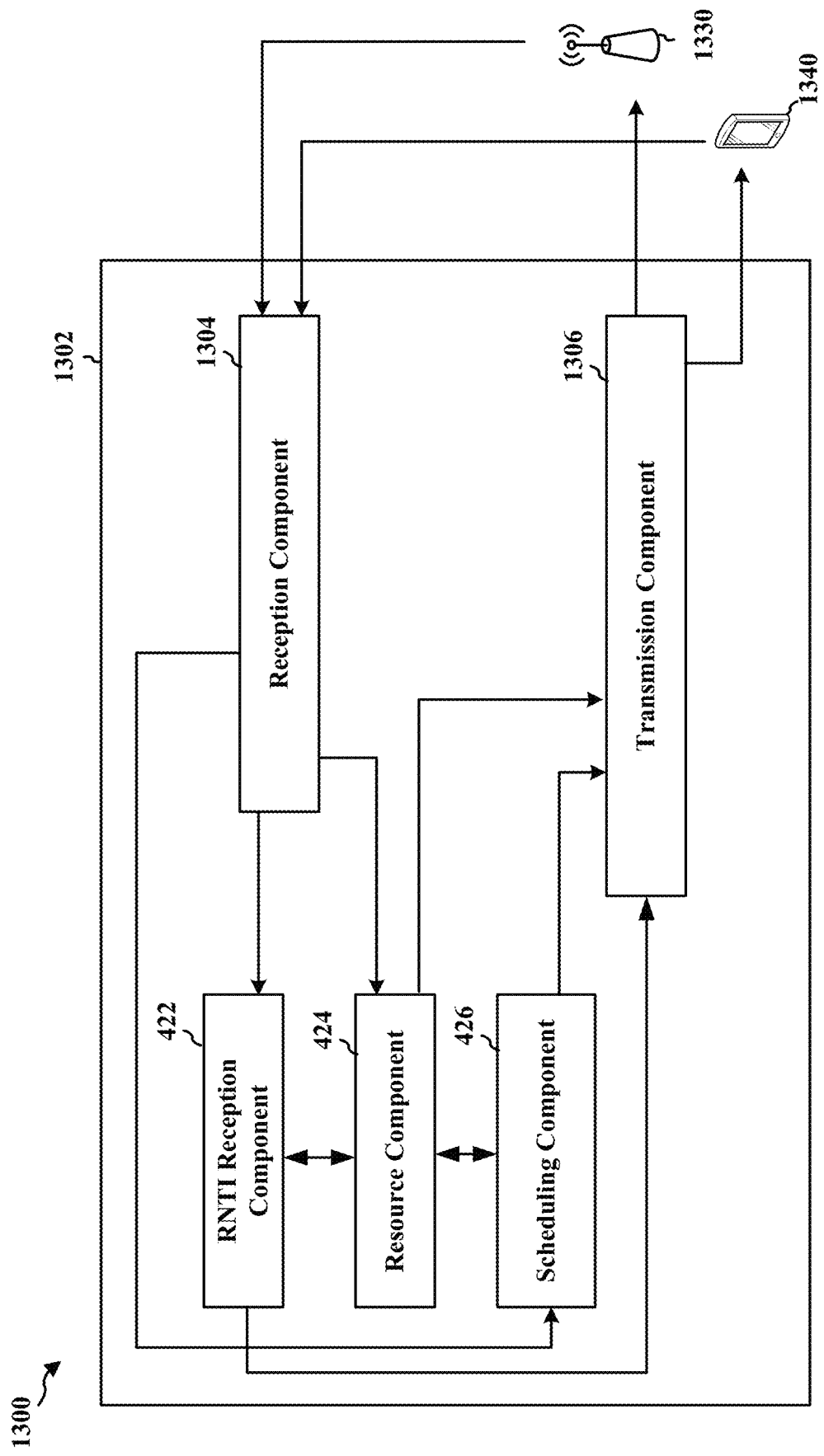
FIG. 13 is a conceptual data flow diagram illustrating the data flow between different means/components in an example apparatus such as a remote UE having a communication component.

FIG. 13 is a conceptual data flow diagram 1300 illustrating the data flow between different means/components in an exemplary apparatus 1302. The apparatus may be a remote UE. The apparatus includes a reception component 1304, a transmission component 1306, an RNTI reception component 422, a resource component 424, and a scheduling component 426. The apparatus 1302 may receive communication from a base station 1330 via the reception component 1304, and may transmit communication to the base station 1330 via the transmission component 1306. Further, the apparatus 1302 may receive communication from a remote UE 1340 via the reception component 1304, and may transmit communication to the remote UE 1340 via the transmission component 1306. The RNTI reception component 422, the resource component 424, and the scheduling component 426 may facilitate D2D communication as described herein with respect to FIG. 4.

The apparatus may include additional components that perform each of the blocks of the algorithm in the aforementioned flowcharts of FIGS. 6, 8, and 9. As such, each block in the aforementioned flowcharts of FIGS. 6, 8, and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
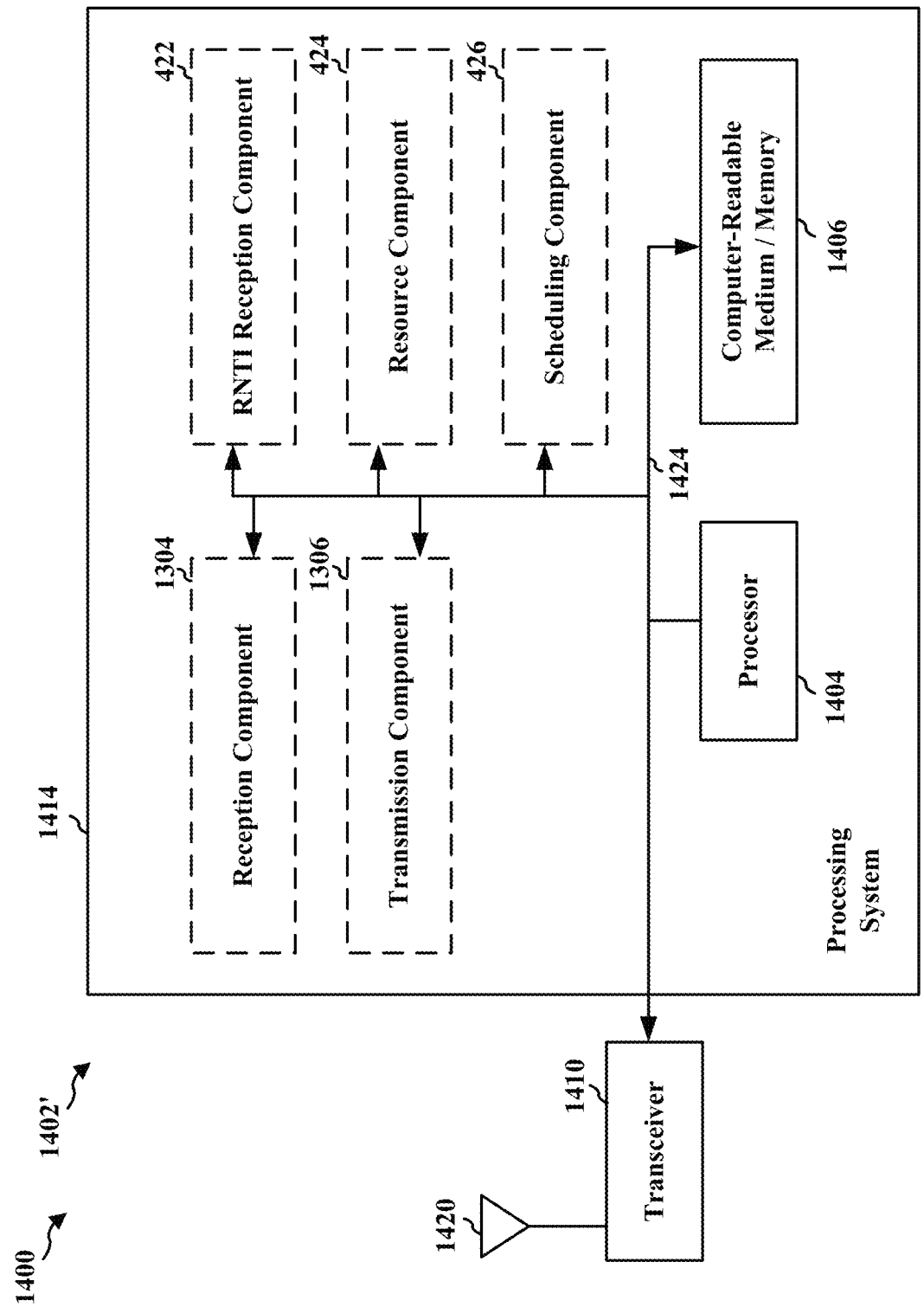
FIG. 14 is a diagram illustrating an example of a hardware implementation for an apparatus employing a processing system.

FIG. 14 is a diagram 1400 illustrating an example of a hardware implementation for an apparatus 1402' employing a processing system 1414. The processing system 1414 may be implemented with a bus architecture, represented generally by the bus 1424. The bus 1424 may include any number of interconnecting buses and bridges depending on the specific application of the processing system 1214 and the overall design constraints. The bus 1424 links together various circuits including one or more processors and/or hardware components, represented by the processor 1204, the components 1304, 1306 422, 424, 426, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1306, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 422, 424, and 426. The components may be software components running in the processor 1404, resident/stored in the computer readable medium/memory 1406, one or more hardware components coupled to the processor 1204, or some combination thereof. The processing system 1414 may be a component of the UE 350 and may include the memory 360 and/or at least one of the TX processor 368, the RX processor 356, and the controller/processor 359.

In one configuration, the apparatus 1402/1402' for wireless communication includes means for receiving, on a downlink channel from a network entity, an indication to establish a connection with a relay UE on a sidelink channel, the relay UE being in a connected state with the network entity, means for establishing the connection with the relay UE on the sidelink channel, and means for receiving, from the relay UE on the sidelink channel, a sidelink grant associated with the RNTI of the remote UE.

In another configuration, the apparatus 1402/1402' for wireless communication includes means for receiving, on at least one sidelink channel, resource allocation information from a relay UE, the resource allocation information indicating one or more resources allocated for sidelink communication for the remote UE, and means for transmitting, one the one or more sidelink channels, data to the relay UE.

In an additional configuration, the apparatus 1402/1402' for wireless communication includes means for transmitting, on at least one sidelink channel, a scheduling request to a relay UE connected with a network entity, and means for receiving, on one or more sidelink channels, a scheduling indication including a resource grant from the relay UE.

The aforementioned means may be one or more of the aforementioned components of the apparatus 1302 and/or the processing system 1414 of the apparatus 1402' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a relay user equipment (UE), comprising:
   receiving, on a downlink channel from a network entity, at least one indication including resource allocation information for at least one of the relay UE or a remote UE, wherein the resource allocation information corresponds to downlink control information (DCI) including a resource allocation for at least one of the relay UE or the remote UE at a first time value representing a subframe slot plus a first time variable associated with the resource allocation;
   determining a second time variable such that the first time value plus the first time variable is equal to the second time value plus the second time variable; and
   transmitting, on a sidelink channel to the remote UE, the resource allocation information of the remote UE, including transmitting the DCI as a medium access control (MAC) control element (CE) as part of a sidelink shared channel (SL-SCH) data, wherein the DCI is transmitted at the second time value representing the subframe slot plus a second time variable less than the first time variable.

2. The method of claim 1, wherein the first time variable corresponds at least one of a fixed value or a radio resource control (RRC) configured value.

3. The method of claim 1, wherein the DCI is scrambled with at least a cell radio network temporary identifier (C-RNTI) of the relay UE or an RNTI of the remote UE.

4. The method of claim 1, wherein the DCI is transmitted via an enhanced physical downlink control channel (E-PDCCH).

5. The method of claim 1, wherein the resource allocation information includes a bulk allocation of resources for one or more remote UEs including the remote UE and associated with a semi-persistent scheduling (SPS) configuration.

6. The method of claim 5, wherein transmitting the resource allocation information to the remote UE includes allocating, for at least the remote UE, a single resource from the resources at a distinct time.

7. The method of claim 5, wherein the indication further includes a periodicity indication associated with an SPS-RNTI, the periodicity indication representing a repetition period for the bulk allocation of resources, and
wherein transmitting the resource allocation information to the remote UE includes:
transmitting the DCI as sidelink control information (SCI) without associated data to the remote UE, or
transmitting the DCI as a medium access control (MAC) control element (CE) as part of a sidelink shared channel (SL-SCH) data.

8. The method of claim 1, further comprising:
determining a first timing advance information; and
transmitting the first timing advance information to the remote UE.

9. The method of claim 8, wherein determining the first timing advance information includes:
receiving, from the network entity, a second timing advance information for use in transmissions between the relay UE and the network entity; and
setting the first timing advance information equal to the second timing advance information.

10. The method of claim 8, wherein determining the first timing advance information includes:
receiving, from the network entity, a second timing advance information for use in transmissions between the relay UE and the network entity;
determining a timing offset based on a received timing of one or more sidelink channels; and
setting the first timing advance information as a function of the second timing advance information and the timing offset.

11. The method of claim 10, further comprising:
determining whether the timing offset is within at least one of a minimum limit or maximum limit; and
adjusting the timing offset to at least one of the minimum limit or the maximum limit.

12. The method of claim 11, wherein at least one of the minimum limit or maximum limit is within a fixed autonomous timing correction limit allowed by the network entity.

13. The method of claim 11, wherein at least one of the minimum limit or maximum limit is received as an RRC configuration from the network entity.

14. The method of claim 8, further comprising transmitting one or more sidelink synchronization signals to the remote UE utilizing timing that corresponds to the first timing advance information.

15. A method of wireless communication at a remote user equipment (UE), comprising:
receiving, on at least one sidelink channel, resource allocation information from a relay UE, the resource allocation information indicating one or more resources allocated for sidelink communication for the remote UE, including receiving downlink control information (DCI) as a medium access control (MAC) control element (CE) as part of a sidelink shared channel (SL-SCH) data;
receiving, on the at least one sidelink channel, timing advance information from the relay UE, wherein the timing advance information is a function of a second timing advance information and a timing offset, the second timing advance information for use in transmissions between the relay UE and a network entity; and
transmitting, on one or more sidelink channels, data to the relay UE in accordance with the one or more resources allocated for sidelink communication and the timing advance information.

16. The method of claim 15, wherein the timing advance information corresponds to at least one of the relay UE or the remote UE.

17. The method of claim 15, wherein receiving the timing advance information includes:
detecting a sidelink synchronization signal transmitted by the relay UE; and
determining the timing advance information based on the sidelink synchronization signal.

18. The method of claim 15, wherein the resource allocation information corresponds to at least one of the one or more resources allocated by a network entity or the relay UE.

19. A relay user equipment (UE) for wireless communication, comprising:
a memory; and
a processor in communication with the memory, wherein the processor is configured to:
receive, on a downlink channel from a network entity, at least one indication including resource allocation information for at least one of the relay UE or a remote UE, wherein the resource allocation information corresponds to downlink control information (DCI) including a resource allocation for at least one of the relay UE or the remote UE at a first time value representing a subframe slot plus a first time variable associated with the resource allocation;
determining a second time variable such that the first time value plus the first time variable is equal to the second time value plus the second time variable; and
transmit, on a sidelink channel to the remote UE, the resource allocation information of the remote UE, including to transmit the DCI as a medium access control (MAC) control element (CE) as part of a sidelink shared channel (SL-SCH) data, wherein the DCI is transmitted at the second time value representing the subframe slot plus a second time variable less than the first time variable.

20. The relay UE of claim 19, wherein the resource allocation information includes a bulk allocation of resources for one or more remote UEs including the remote UE and associated with a semi-persistent scheduling (SPS) configuration.

21. The relay UE of claim 19, wherein the processor is further configured to:
determine a first timing advance information; and transmit the first timing advance information to the remote UE.

22. A remote user equipment (UE) for wireless communication, comprising:
a memory; and
a processor in communication with the memory, wherein the processor is configured to:
receive, on at least one sidelink channel, resource allocation information from a relay UE, the resource allocation information indicating one or more resources allocated for sidelink communication for the remote UE, including to receive downlink control information (DCI) as a medium access control (MAC) control element (CE) as part of a sidelink shared channel (SL-SCH) data;
receive, on the at least one sidelink channel, timing advance information from the relay UE, wherein the timing advance information is a function of a second timing advance information and a timing offset, the second timing advance information for use in transmissions between the relay UE and a network entity; and
transmit, on one or more sidelink channels, data to the relay UE in accordance with the one or more resources allocated for sidelink communication and the timing advance information.

23. The remote UE of claim 22, wherein the timing advance information corresponds to at least one of the relay UE or the remote UE.

* * * * *